(12) United States Patent
Jonson et al.

(10) Patent No.: US 12,516,640 B2
(45) Date of Patent: Jan. 6, 2026

(54) METHODS TO REDUCE COMBUSTION TIME AND TEMPERATURE IN AN ENGINE

(71) Applicant: HyTech Power, LLC, Redmond, WA (US)

(72) Inventors: Hugh Jonson, Anacortes, WA (US); Peter Riesselman, Anacortes, WA (US); Ron Bingel, Mt. Vernon, WA (US); Jay Morrow, La Conner, WA (US); Fred Hess, Anacortes, WA (US); Robb Robel, Mt. Vernon, WA (US)

(*) Notice: Subject to any disclaimer, the term of this patent is extended or adjusted under 35 U.S.C. 154(b) by 19 days.

(21) Appl. No.: 18/538,914

(22) Filed: Dec. 13, 2023

(65) Prior Publication Data
US 2024/0110527 A1    Apr. 4, 2024

Related U.S. Application Data

(63) Continuation of application No. 15/003,465, filed on Jan. 21, 2016, now Pat. No. 11,879,402, which is a continuation of application No. 13/777,551, filed on Feb. 26, 2013, now Pat. No. 9,267,428.

(60) Provisional application No. 61/603,753, filed on Feb. 27, 2012.

(51) Int. Cl.
| | |
|---|---|
| F02D 41/00 | (2006.01) |
| C25B 1/04 | (2021.01) |
| C25B 9/17 | (2021.01) |
| C25B 11/00 | (2021.01) |
| C25B 15/08 | (2006.01) |
| F02B 43/00 | (2006.01) |
| F02M 25/12 | (2006.01) |
| F02B 43/10 | (2006.01) |

(52) U.S. Cl.
CPC ............ *F02D 41/0007* (2013.01); *C25B 1/04* (2013.01); *C25B 9/17* (2021.01); *C25B 11/00* (2013.01); *C25B 15/08* (2013.01); *F02B 43/00* (2013.01); *F02M 25/12* (2013.01); *F02B 2043/106* (2013.01); *Y02E 60/36* (2013.01); *Y02T 10/12* (2013.01)

(58) Field of Classification Search
CPC ............... F02D 41/0007; F02B 43/00; F02B 2043/106; F02M 25/12; F02M 25/10; F02M 25/00; C25B 1/02; C25B 1/04; C25B 1/06; C25B 9/00; C25B 9/17; C25B 11/00; C25B 15/00; C25B 15/02; C25B 15/08; Y02E 60/36; Y02T 10/12
See application file for complete search history.

(56) References Cited

U.S. PATENT DOCUMENTS

| | | | | |
|---|---|---|---|---|
| 5,690,797 A | * | 11/1997 | Harada | C25B 1/04 204/266 |
| 7,258,779 B2 | * | 8/2007 | Casey | C25B 9/17 205/744 |
| 2005/0072687 A1 | * | 4/2005 | Hubbard | C01B 11/062 205/516 |
| 2010/0012090 A1 | * | 1/2010 | Lewis, III | F02B 43/10 123/3 |

(Continued)

*Primary Examiner* — Grant Moubry
(74) *Attorney, Agent, or Firm* — Powell IP Law, PLLC

(57) ABSTRACT

Methods and apparatuses are provided to reduce combustion time and/or combustion temperature in an internal combustion engine. In an exemplary embodiment, intake air and oxygen-rich gas are introduced upstream of a turbofan, wherein the amount of oxygen rich gas is controlled in proportion to the engine speed.

16 Claims, 13 Drawing Sheets

(56) References Cited

U.S. PATENT DOCUMENTS

2010/0155233 A1\* 6/2010 Hwang ................... C25B 15/00
204/228.6

\* cited by examiner

Power slot =
7/32" or
0.219"

← 4.50" →

All gasket holes are an "F" bit ≈ 0.257"

Hole Pattern from CAD drawing provided.

(All holes symmetrical about a vertical centerline)

All hole centers are 0.250" in from edge of plate.

7/32" slot & hole    1.125"

All hole centers are 0.250" in from edge of plate.

Flow holes both on center line, 0.864" in from edge to center of 0.257" hole.

Hole Pattern from CAD drawing provided.

(All holes symmetrical about a vertical centerline)

On center line, 0.864" in from edge to center of hole 11.25"

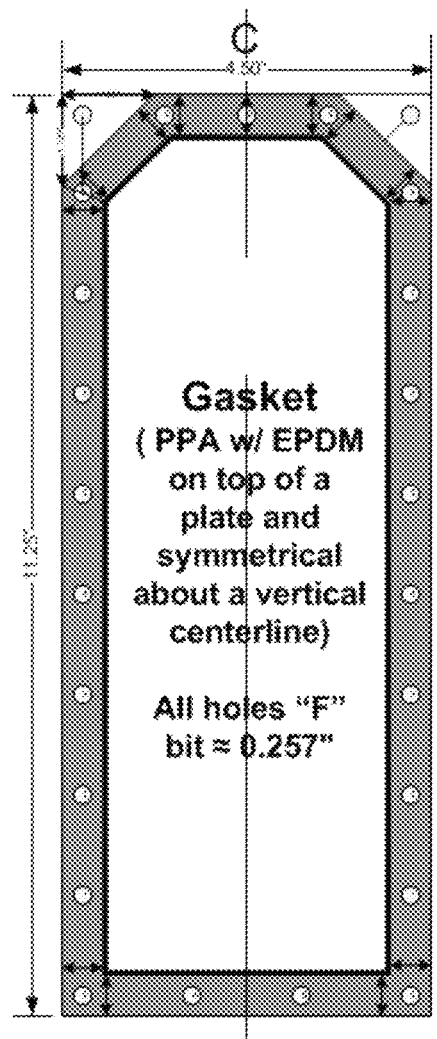

Δx ≈ 0.6124375 x 2
Δx ≈ 1.224875" up&dn #1 to #9

Gasket
( PPA w/ EPDM on top of a plate and symmetrical about a vertical centerline)

All holes "F"
bit ≈ 0.257"

Bottom-Left of gasket:
X= 0.000    Y= 0.000
Y Eq'n = 0.25 + 1.224875 x (hole #)

Left Set of holes
Hole Locations:

| # | X | Y |
|---|------|-------|
| 0 | 0.2500 | 0.2500 |
| 1 | 0.2500 | 1.4749 |
| 2 | 0.2500 | 2.6998 |
| 3 | 0.2500 | 3.9246 |
| 4 | 0.2500 | 5.1495 |
| 5 | 0.2500 | 6.3744 |
| 6 | 0.2500 | 7.5993 |
| 7 | 0.2500 | 8.8241 |
| 8 | 0.2500 | 10.049 |

Right set of holes
Y Eq'n = 0.250 + 1.224875 x (hole #)
Hole locations:

| # | X | Y |
|---|------|-------|
| 0 | 4.2500 | 0.2500 |
| 1 | 4.2500 | 1.4749 |
| 2 | 4.2500 | 2.6998 |
| 3 | 4.2500 | 3.9246 |
| 4 | 4.2500 | 5.1495 |
| 5 | 4.2500 | 6.3744 |
| 6 | 4.2500 | 7.5993 |
| 7 | 4.2500 | 8.8241 |
| 8 | 4.2500 | 10.049 |

Remaining bottom set of holes A & B
Where A=1, B=2
X Eq'n = 0.25 + 1.333333 x (letter value)

| # | X | Y |
|---|------|-------|
| A | 1.5833 | 0.2500 |
| B | 2.9167 | 0.2500 |

Remaining top set of holes C, D, & E
Where C=1, D=2, E=3
X Eq'n = 0.25 + 1.0000 x (letter value)

| # | X | Y |
|---|------|-------|
| C | 1.2500 | 11.000 |
| D | 2.2500 | 11.000 |
| E | 3.2500 | 11.000 |

METHODS TO REDUCE COMBUSTION TIME AND TEMPERATURE IN AN ENGINE

CROSS-REFERENCE TO RELATED APPLICATIONS

This application is a continuation of U.S. patent application Ser. No. 15/003,465, filed Jan. 21, 2016, which is a continuation of U.S. patent application Ser. No. 13/777,551, filed Feb. 26, 2013, which further claims the benefit of U.S. Provisional Application No. 61/603,753, filed Feb. 27, 2012. The foregoing related applications, in their entirety, are incorporated herein by reference.

FIELD OF THE DISCLOSURE

This disclosure relates to systems and methods for generating a gas mixture for use in an internal combustion engine. In exemplary embodiments, the gas mixture may be derived from a composition comprising water which can be delivered to the internal combustion engine to improve certain metrics of the internal combustion engine. In exemplary embodiments, the internal combustion engine may be a diesel engine, or more particularly, a turbocharged diesel engine.

BACKGROUND OF THE DISCLOSURE

Worldwide emissions, stemming primarily from the burning of fossil fuels, are reaching the highest levels ever recorded. By some measures, the emissions associated with burning fossil fuels have already reached nearly 5 metric tons/person/year. Internal combustion engines, including diesel engines, are a major contributor of fossil fuel emissions. In fact, by some measures, there are over 300 million diesel engines worldwide.

Internal combustion engines, and diesel engines in particular, emit particulate matter (PM) and governments around the world are realizing that these emissions are a cause for great concern. As a result, many countries/jurisdictions, including the United States, the European Union and China, are passing regulations which require significantly reduced emissions from internal combustion engines, including diesel engines.

Accordingly, more and more, businesses are forced to comply with these new air quality standards at their own expense. Sometimes, the costs for modifying large fleets of vehicles to meet new regulations can exceed US $30,000 per vehicle.

An attributable amount of emissions created by internal combustion engines is a result of the internal combustion engines failure to convert all of the energy available in the hydrocarbon fuel (e.g., gasoline and/or diesel fuel). This incomplete conversion is often a result of what is commonly referred to as incomplete combustion of the fuel. Incomplete combustion results in an unnecessary loss of fuel efficiency and an increase in pollution.

Accordingly, it is desirable to have a system and/or method for use with an internal combustion engine, that aids in achieving more complete combustion of the hydrocarbon fuel, reduced emissions, and/or better fuel economy, or otherwise improves certain metrics of the internal combustion engine.

BRIEF SUMMARY OF THE DISCLOSURE

Exemplary embodiments described herein may be capable of achieving an improvement in the fuel efficiency of an internal combustion engine. In exemplary embodiments, the internal combustion engine may include gasoline engines, diesel engines, turbocharged diesel engines, supercharged diesel engines, direct injection diesel engines, trunk-piston diesel engines, crosshead diesel engines, marine diesel engines, locomotive diesel engines, low-speed diesel engines, medium-speed diesel engines, high-speed diesel engines, double-acting diesel engines, 2-stroke engines, 4-stroke engines and combinations thereof. In exemplary embodiments, internal combustion engines may realize a fuel efficiency increase of at least 5%, e.g., at least 10%, at least 15%, at least 20%, at least 25%, at least 30%, at least 35%, at least 40%, at least 45%, at least 50%, or more. In exemplary embodiments, the fuel efficiency increase may be in the range of between 5-50%, e.g., between 5-10%, between 5-25%, between 7-12%, between 10-20%, between 15-25%, between 20-25%, between 20-30%, between 20-50%, between 30-35%, between 30-38%, between 40-50%, between 40-45%, or between 44-50%.

Exemplary embodiments described herein may be capable of achieving substantially complete combustion, or at least more complete combustion, within the internal combustion engine. In exemplary embodiments, more complete combustion may be more than 10%, e.g., more than 20%, more than 30%, more than 40%, more than 50%, more than 60%, more than 70%, more than 80%, more than 90%, or more than 99% combustion of the hydrocarbon fuel provided to the internal combustion engine. In exemplary embodiments, substantially complete combustion may be more than 80%, e.g., more than 85%, more than 90%, more than 95%, more than 96%, more than 97%, more than 98%, or more than 99% combustion of the hydrocarbon fuel provided to the internal combustion engine. In exemplary embodiments the amount of combustion may be increased by at least 10%, e.g., at least 20%, at least 30%, at least 40%, at least 50%, at least 60%, at least 70%, at least 80%, at least 90%, or at least 100%. In exemplary embodiments the amount of combustion may be increased by between 10-100%, e.g., between 10-20%, between 10-50%, between 15-25%, between 20-30%, between 25-35%, between 30-40%, between 30-70%, between 35-45%, between 40-50%, between 45-55%, between 50-60%, between 55-65%, between 60-70%, between 60-85%, between 65-75%, between 70-80%, between 75-85%, between 80-90%, between 80-100%, between 85-95%, or between 90-100%.

Exemplary embodiments described herein may be capable of improving the operation of the internal combustion engine. For example, in exemplary embodiments described herein, the internal combustion engine may operate at a cooler temperature and/or may run cleaner.

Exemplary embodiments described herein may produce an oxygen-hydrogen gas mixture. In exemplary embodiments, the gas mixture may be a low temperature plasma. In exemplary embodiments, the plasma may be a cleaner plasma than that produced by other systems and/or methods. In exemplary embodiments, the plasma may be an oxygen-rich plasma. In exemplary embodiments, the gas mixture may be an oxygen-rich or hydrogen-rich a gas mixture. In exemplary embodiments, the gas mixture may comprise at least one or more of the following aqueous solution electrolysis components: monatomic oxygen, diatomic oxygen, monatomic hydrogen, diatomic hydrogen, hydrogen ions, oxygen ions, mononuclear oxygen, mononuclear ozone, singlet oxygen, hydroxide ions, hydronium ions, superoxide, hydrogen superoxide, hydroxide radical, peroxide radical, ionic peroxide, combinations of one or more of these and/or mixtures of the same. For example, in exemplary embodiments, the gas mixture may be a gas mixture comprising at least hydrogen ions and oxygen ions, or diatomic oxygen and diatomic hydrogen, or oxygen ion and diatomic oxygen, etc.

Exemplary embodiments described herein may produce a gas mixture that is approximately two parts hydrogen to one part oxygen (e.g., 2:1) or less than 2:1 (e.g., 1.75:1, 1.5:1, 1.25:1, 1:1, 0:75:1, 0.5:1, etc.). In exemplary embodiments, the gas mixture produced may be modified before being delivered to the internal combustion engine. For example, in exemplary embodiments, the gas mixture may be combined with an additive and/or the composition of the gas mixture may be modified by adding, recycling or removing portions of the gas mixture. For example, in exemplary embodiments, the electrolysis process may generate a hydrogen to oxygen ratio of between 1.8:1 to 2.3:1, for example a hydrogen to oxygen ratio of 2:1 and the system may be configured to deliver a gas mixture having a hydrogen to oxygen ratio of less than 2:1, for example a hydrogen to oxygen ratio of 1.8:1 or less, such as 1.7:1 or less, 1.5:1 or less, 1.3:1 or less, by removing, or recycling, a portion of the hydrogen from the gas mixture prior to delivery. Alternatively, in exemplary embodiments, the system may generate a hydrogen to oxygen ratio of 2:1, but some of the hydrogen or oxygen, e.g., oxygen, may be trapped in bubbles, the system may be configured to release the trapped oxygen to effectively deliver more oxygen to the internal combustion engine.

Exemplary embodiments described herein may produce a gas mixture that is approximately two parts oxygen to one part hydrogen (e.g., 2:1) or less than 2:1 (e.g., 1.75:1, 1.5:1, 1.25:1, 1:1, etc.). In exemplary embodiments, the electrolysis process may generate an oxygen to hydrogen ratio of between 1.8:1 to 2.3:1, for example an oxygen to hydrogen ratio of 2:1 ratio, and the system may be configured to deliver a gas mixture having an oxygen to hydrogen ratio of less than 2:1, for example an oxygen to hydrogen ratio of 1.8:1 or less, 1.7:1 or less, 1.5:1 or less, 1.3:1 or less by removing, adding or recycling a portion of the hydrogen or oxygen from the gas mixture prior to delivery. In exemplary embodiments, the system may generate an oxygen to hydrogen ratio of less than 3.5:1, less than 3:1, less than 2.75:1, less than 2.5:1.

Exemplary embodiments described herein may result in a more reliably controlled gas mixture generation process. For example, in exemplary embodiments, the current provided to the system for gas generation may be continually or continuously regulated or controlled, for example, in real time (or substantially real time), so as to provide predetermined or controlled quantity of gas, for example, in relation to the engine speed and/or demand.

Exemplary embodiments described herein may utilize a substantially closed-loop system that recycles a water-reagent (or water-electrolyte or aqueous solution electrolysis component) mixture in an effort to reduce its consumption.

Exemplary embodiments described herein may be used to alter combustion (e.g., diesel combustion) chemistry to reduce particulate formation. In exemplary embodiments, internal combustion engines may realize a reduction in particulate formation of greater than 5%, greater than 10%, greater than 15%, greater than 20%, greater than 25%, greater than 30%, greater than 35%, greater than 40%, greater than 50%, greater than 60%, greater than 75%, greater than 80%, greater than 90%, greater than 95% or close to 100%. Exemplary embodiments described herein may be used to increase the concentration of an oxidizer in an internal combustion engine. In exemplary embodiments, the increase in the amount of oxidizers may be at least 5%, at least 10%, at least 15%, at least 20%, at least 25%, at least 30%, at least 35%, at least 40%, at least 45%, or at least 50%. In exemplary embodiments, the increase in the amount of oxidizers may be between 5-50%, such as between 10-20%, between 15-25%, between 20-30%, between 25-35%, between 30-40%, between 35- 45%, or between 40-50%. Exemplary embodiments described herein may be used as a mechanism for distributing the oxidizer for more even air/fuel mixture. Exemplary embodiments described herein may be used to generate a gas mixture that is an accelerant to speed combustion, enhance combustion, and/or increase the extent of combustion. Exemplary embodiments described herein may be used to displace air with oxygen and/or hydrogen within the engine's intake system. Exemplary embodiments described herein may be used to displace air within the engine's intake system with the gas mixture, resulting from the gas mixture generator system. Exemplary embodiments described herein may be used to create a shorter combustion process that lowers the engine temperature thereby reducing the formation of nitrogen oxides.

Exemplary embodiments described herein may generate a gas mixture resulting from electrolysis of an aqueous solution and introducing at least a portion, typically a substantial portion (e.g., greater than 95 wt. %), of the gas mixture into the engine's intake for improved combustion. Exemplary embodiments described herein may generate an optimized or partially optimized quantity of a gas mixture, such as a gas mixture having one or more aqueous solution electrolysis components, into the engine's intake for improved combustion. In exemplary embodiments, the system may be configured to produce in the range of between 1-7.5 liters of gas per minute, such as 1.2, 1.7, 2.0, 2.9, 3.5, 5.0, or 7.0 liters of gas per minute, and/or produce in the range of between 0.08-0.75 liters of gas per minute per liter of engine displacement, such as 0.1, 0.12, 0.17, 0.20, 0.25, 0.29, 0.3, 0.32, 0.35, 0.4, 0.45, 0.50, 0.6, or 0.70 liters of gas per minute per liter of engine displacement. In exemplary embodiments, the system may be configured to produce in the range of between 0.25-3 liters of gas per minute, such as between 0.25-2.5, between 0.25-2, between 0.25-1.5, between 0.25-1, between 0.25-0.50, between 0.50-0.75, between 0.5-2.5, between 0.5-1.5, between 0.75-1, between 1-2, between 1-3, between 1-1.5, between 1.25-1.75, between 1.5-2, between 2-2.5, between 2.5-3 liters of gas per minute.

Exemplary embodiments described herein relate to a system for generating a gas mixture for use with an internal combustion engine, the system may comprise a tank configured to store an aqueous solution consisting essentially of water and a predetermined quantity of electrolyte (reagent). The system may further comprise a cell (i.e., an electrolytic cell) configured for aiding in the electrolysis of the aqueous solution. The cell may comprise a plurality of plates arranged substantially parallel to one another and be spaced substantially equidistant from an adjacent one of the plurality of plates, and at least one seal located between the plurality of plates to create a substantially air tight and substantially water tight seal between adjacent ones of the plurality of plates to aid in preventing the aqueous solution located between adjacent ones of the plurality of plates from leaking out of the cell. In exemplary embodiments, the at least one seal may comprise a relatively hard plastic portion with a first thickness for maintaining the predetermined distance between adjacent plates, and a relatively soft sealing portion, typically, a soft, often rubber or rubber-like portion, with a second thickness for maintaining the substantially airtight and substantially watertight seal between adjacent ones of the plurality of plates.

In exemplary embodiments described herein, the system may further comprise a pump configured to circulate the aqueous solution between the tank and the cell and back into the tank.

In exemplary embodiments described herein, the system may further comprise a scrubber for removing at least a portion of the moisture and/or electrolyte from the gas mixture.

In exemplary embodiments described herein, the system may further comprise a controller configured to apply a pulse width modulated voltage to the cell to generate the gas mixture within the cell. In exemplary embodiments, the controller may be configured to regulate the current provided to the cell by controlling the duty cycle of the pulse width modulated voltage. In exemplary embodiments, the duty cycle may be controlled in real time and/or substantially real time.

In exemplary embodiments described herein, the system may further comprise an output for outputting the gas mixture to the internal combustion engine.

In exemplary embodiments described herein, the gas mixture may be input into the tank prior to being output to the internal combustion engine. In exemplary embodiments, the gas mixture may be output to the internal combustion engine without being input into the tank.

In exemplary embodiments described herein, the flow of aqueous solution from the tank may be at a first flow rate and the flow of aqueous solution into the cell may be at a second flow rate different than the first flow rate.

In exemplary embodiments described herein, the second flow rate may be less than the first flow rate. In exemplary embodiments, the flow ratio may be greater than (or less than) 0.25-5:1, such as 0.25:1, 0.50:1, 0.75:1, 0.1:1, 1.25:1, 1.50:1, 1.75:1, 2:1, 2:5:1, 3:1, 3.5:1, 4:1, or, 4.5:1, etc.

In exemplary embodiments described herein, the system may further comprise a radiator configured to cool the aqueous solution exiting the cell before it returns to the tank. In exemplary embodiments, it may be desirable to keep the aqueous solution under 20° C., 30° C., 40° C., 50° C., 60° C., 70° C., or 80° C., etc.

In exemplary embodiments described herein, the tank may be manufactured of a material that is non-conductive.

In exemplary embodiments described herein, the electrolyte may be one selected from the group consisting of: KOH, NaOH, $Na_2CO_3$, $NaHCO_3$, NaCl, K2CO3, KHCO3, H2SO4, and CH3COOH.

In exemplary embodiments described herein, the size of the tank may be selected such that the aqueous solution occupies less than ¼, ⅓, ½, ⅔, or ¾, the volume of the tank during operation. In exemplary embodiments, the tank may have a capacity of 2, 3, 4, 5, 6, 7, 8, 9, or 10 liters. For larger applications, the tank may be even larger or in exemplary embodiments, there may be multiple tanks.

In exemplary embodiments described herein, the cell may comprise at least two plates, a first plate configured to be coupled to a positive terminal of a voltage source and a second plate configured to be coupled to a negative terminal of the voltage source.

In exemplary embodiments described herein, the cell may further comprise at least one neutral plate configured in a series relationship to the first plate and the second plate.

In exemplary embodiments described herein, the cell may comprise at least 2, at least 3, at least 4, at least 5, at least 6, at least 7, at least 8, at least 9, at least 10, at least 11, at least 12, at least 13, at least 14, or at least 15 neutral plates. In exemplary embodiments, the number of neutral plates may be selected to obtain a desired voltage drop between the plates.

In exemplary embodiments described herein, the soft rubber portion of the seal may be positioned on an inner edge of the hard plastic portion of the seal.

In exemplary embodiments described herein, the soft rubber portion may be located on the outer edge of hard plastic portion.

In exemplary embodiments described herein, the seal may comprise at least two soft plastic portions a first soft plastic portion may be located between the interface of the hard plastic portion and a first one of the adjacent plates and a second soft plastic portion may be located between the interface of the hard plastic portion and a second one of the adjacent plates.

In exemplary embodiments described herein, the soft plastic portion may surround the hard plastic portion of the seal.

In exemplary embodiments described herein, the thickness of the soft rubber portion may be larger than the thickness of the hard plastic portion of the seal.

In exemplary embodiments described herein, the hard plastic portion may be 0.002", 0.003", 0.004", 0.005", 0.006", 0.007", 0.008", 0.009", 0.010", 0.0125", 0.025", 0.0375", 0.050", 0.0625", or 0.075" thick.

In exemplary embodiments described herein, the soft rubber portion may be 0.002", 0.003", 0.004", 0.005", 0.006", 0.007", 0.008", 0.009", 0.010", 0.011", 0.012", 0.13", 0.014", 0.030", 0.038", 0.055", 0.0675", or 0.080" thick.

In exemplary embodiments described herein, the hard plastic portion may be manufactured from a material selected such that the hard plastic portion does not significantly react with the aqueous solution.

In exemplary embodiments described herein, the hard plastic portion may be manufactured from high density polyethylene (HDPE), polyphthalamide (PPA), styrene, or combinations thereof.

In exemplary embodiments described herein, the soft rubber portion may be manufactured from a material selected such that the soft rubber portion does not significantly react with the aqueous solution.

In exemplary embodiments described herein, the soft rubber portion may be manufactured from ethylene propylene diene monomer (EPDM).

In exemplary embodiments described herein, the internal combustion engine may be a turbocharged diesel engine and the gas mixture may be input into the turbocharged diesel engine up stream of a turbo fan.

In exemplary embodiments described herein, the scrubber may comprise a switch configured to sense excess liquid and/or moisture in the form of foam in the gas stream and shut-off the electrolysis process to prevent the excess moisture from entering the internal combustion engine, and/or the accumulation of the gas mixture.

In exemplary embodiments, the exemplary methods may realize a fuel efficiency increase of at least 5%, e.g., at least 10%, at least 15%, at least 20%, at least 25%, at least 30%, at least 35%, at least 40%, at least 45%, at least 50%, or more. In exemplary embodiments, the fuel efficiency increase may be in the range of between 5-50%, e.g., between 5-10%, between 5-25%, between 7-12%, between 10-20%, between 15-25%, between 20-25%, between 20-30%, between 20-50%, between 30-35%, between 30-38%, between 40-50%, between 40-45%, or between 44-50%.

Exemplary methods described herein may be capable of achieving substantially complete combustion, or at least more complete combustion, within the internal combustion engine. In exemplary embodiments, more complete combustion may be more than 10%, more than 20%, more than 30%, more than 40%, more than 50%, more than 60%, more than 70%, more than 80%, more than 90%, or more than 99% combustion of the hydrocarbon fuel provided to the internal combustion engine. In exemplary embodiments, substantially complete combustion may be more than 80%, more than 85%, more than 90%, more than 95%, more than 96%, more than 97%, more than 98%, or more than 99% combustion of the hydrocarbon fuel provided to the internal combustion engine. In exemplary embodiments the methods may be capable of increasing the amount of combustion by at least 5%, e.g., increasing the amount of combustion by at least 10%, at least 20%, at least 30%, at least 40%, at least 50%, at least 60%, at least 70%, at least 80%, at least 90%, or at least 100%. In exemplary embodiments the amount of combustion may be increased by between 5-100%, e.g., between 10-20%, between 10-50%, between 15-25%, between 20-30%, between 20-70%, between 25-35%, between 30-40%, between 35-45%, between 40-50%, between 40-90%, between 45-55%, between 50-60%, between 55-65%, between 60-70%, between 60-95%, between 65-75%, between 70-80%, between 75-85%, between 75-100%, between 80-90%, between 85-95%, or between 90-100%.

Exemplary embodiments described herein may comprise methods capable of improving the operation of the internal combustion engine. For example, in exemplary embodiments described herein, the internal combustion engine may operate at a cooler temperature and/or may run cleaner.

Exemplary embodiments described herein may comprise methods that produce an oxygen-hydrogen gas mixture, such as an oxygen-rich, oxygen- hydrogen gas mixture, or a hydrogen-rich oxygen-hydrogen gas mixture. In exemplary embodiments, the gas mixture may be a low temperature plasma. In exemplary embodiments, the plasma may be a cleaner plasma than that produced by other systems and/or methods. In exemplary embodiments, the plasma may be an oxygen rich plasma. In exemplary embodiments, the gas mixture may be an oxygen- rich or a hydrogen-rich gas mixture. In exemplary embodiments, the gas mixture may comprise at least one or more of the following: aqueous solution electrolysis components: monatomic oxygen, diatomic oxygen, monatomic hydrogen, diatomic hydrogen, hydrogen ions, oxygen ions, mononuclear oxygen, mononuclear, ozone, singlet oxygen, hydroxide ions, hydronium ions, superoxide, hydrogen superoxide, hydroxide radical, peroxide radical, ionic peroxide, combinations of one or more of these and/or mixtures of the same. For example, in exemplary embodiments, the gas mixture may be a gas mixture comprising at least hydrogen ions and oxygen ions, or diatomic oxygen and diatomic hydrogen, or oxygen ion and diatomic oxygen, etc.

Exemplary embodiments described herein may comprise methods capable of producing a gas mixture that is approximately two parts hydrogen to one part oxygen (e.g., 2:1) or less than 2:1 (e.g., 1.75:1, 1.5:1, 1.25:1, 1:1, 0.75:1, 0.5:1, etc.). In exemplary embodiments, the gas mixture produced may be modified before being delivered to the internal combustion engine. For example, in exemplary embodiments, the gas mixture may be combined with an additive and/or the composition of the gas mixture may be modified by adding or removing portions of the gas mixture. For example, in exemplary embodiments, the electrolysis process may generate a hydrogen to oxygen ratio in the range of between 1.8:1 to 2.3:1, for example a hydrogen to oxygen ratio of 2:1, and the method may be capable of delivering a gas mixture having a hydrogen to oxygen ratio of less than 2:1, for example a ratio of 1.8:1 or less, 1.7:1 or less, 1.5:1 or less, 1.3:1 or less, by removing, or recycling, a portion of the hydrogen from the gas mixture prior to delivery. Alternatively, in exemplary embodiments, the method may be capable of generating a 2:1 ratio of hydrogen to oxygen but some of the hydrogen or oxygen, e.g., oxygen, may be trapped in bubbles, the method may be configured to enable the release of the trapped oxygen to effectively deliver more oxygen to the internal combustion engine.

Exemplary embodiments described herein may comprise methods capable of producing a gas mixture that is approximately two parts oxygen to one part hydrogen (e.g., 2:1) or less than 2:1 (e.g., 1.75:1, 1.5:1, 1.25:1, 1:1, etc.). In exemplary embodiments, the electrolysis process may generate between an oxygen to hydrogen ratio in the range of between 1.8:1 to 2.3:1, for example a 2:1 ratio of oxygen to hydrogen and the method may be capable of delivering a gas mixture having an oxygen to hydrogen ratio of less than 2:1, for example an oxygen to hydrogen ratio of 1.8:1 or less, 1.7:1 or less, 1.5:1 or less, 1.3:1 or less. In exemplary embodiments, the methods may generate a ratio of less than 3.5:1, less than 3:1, less than 2.75:1, less than 2.5:1 oxygen to hydrogen.

Exemplary embodiments described herein may comprise methods that result in a more reliably controlled gas mixture generation process. For example, in exemplary embodiments, the current provided for gas generation may be continually or continuously regulated or controlled, for example, in real time (or substantially real time), so a predetermined quantity of gas is consistently produced.

Exemplary embodiments described herein may utilize a substantially closed-loop method of electrolysis that recycles a water-reagent (or water-electrolyte or aqueous solution electrolysis component) mixture in an effort to reduce its consumption.

Exemplary embodiments described herein may comprise methodscapable of altering combustion (e.g., diesel combustion) chemistry to reduce particulate formation. In exemplary embodiments, the methods may be capable of achieving a reduction in particulate formation from an internal combustion engine of greater than 5%, e.g., greater than 10%, greater than 15%, greater than 20%, greater than 25%, greater than 30%, greater than 35%, greater than 40%, greater than 50%, greater than 60%, greater than 75%, greater than 80%, greater than 90%, greater than 95% or close to 100%. Exemplary embodiments described herein may be used to increase the concentration of an oxidizer in an internal combustion engine. In exemplary embodiments, the increase in the amount of oxidizers may be at least 5%, e.g., at least 10%, at least 15%, at least 20%, at least 25%, at least 30%, at least 35%, at least 40%, at least 45%, or at least 50%. In exemplary embodiments, the increase in the amount of oxidizers may be in the range of between 5-50%, such as between 5-25%, between 10-20%, between 10-40%, between 15-25%, between 20-30%, between 25-35%, between 25-50%, between 30-40%, between 40-50%, between 35-45%, or between 40-50%. Exemplary embodiments described herein may be used as a mechanism for distributing the oxidizer for more even air/fuel mixture. Exemplary embodiments described herein may be used to generate a gas mixture that is an accelerant to speed combustion and/or increase combustion completion. Exemplary embodiments described herein may be used to displace air with oxygen and/or hydrogen within the engine's intake system. Exemplary embodiments described herein may be used to create a shorter combustion process that lowers the engine temperature thereby reducing the formation of nitrogen oxides.

Exemplary embodiments described herein may comprise methods for generating an optimized or partially optimized quantity of a gas mixture, such as a gas mixture having one or more aqueous solution electrolysis components, into the engine's intake for improved combustion. In exemplary embodiments, the methods may be capable of producing in the range of between 1-7.5 liters of gas per minute, such as 1.2, 1.7, 2.0, 2.9, 3.5, 5.0, or 7.0 liters of gas per minute, and/or produce in the range of between 0.08-0.75 liters of gas per minute per liter of engine displacement, such as 0.1, 0.12, 0.17, 0.20, 0.25, 0.29, 0.3, 0.32, 0.35, 0.4, 0.45, 0.50, 0.6, or 0.70 liters of gas per minute per liter of engine displacement. In exemplary embodiments, the methods may be capable of producing in the range of between 0.25-3 liters of gas per minute, such as between 0.25-2.5, between 0.25-2, between 0.25-1.5, between 0.25-1, between 0.25-0.50, between 0.50-0.75, between 0.5-2.5, between 0.5-1.5, between 0.75-1, between 1-2, between 1-3, between 1-1.5, between 1.25-1.75, between 1.5-2, between 2-2.5, between 2.5-3 liters of gas per minute.

Exemplary embodiments described herein may relate to a method for reducing the particulate emissions of an internal combustion engine and the method may comprise the steps of generating a gas mixture for use within the internal combustion engine and providing the gas mixture to the internal combustion engine during operation of the internal combustion engine.

In exemplary embodiments, the gas mixture may be generated in substantially real time relative to the consumption of the gas mixture.

In exemplary embodiments, the gas mixture may be generated onboard the vehicle during operation of the internal combustion engine.

In exemplary embodiments a tank may be at least partially filled with an aqueous solution consisting essentially of water and a predetermined quantity of electrolyte (reagent). In exemplary embodiments, the methods may perform electrolysis of the aqueous solution within a cell (i.e., an electrolytic cell) configured for aiding in the electrolysis of the aqueous solution. The cell may comprise a plurality of plates arranged substantially parallel to one another and be spaced substantially equidistant from an adjacent one of the plurality of plates, and at least one seal located between the plurality of plates to create a substantially air tight and substantially water tight seal between adjacent ones of the plurality of plates to aid in preventing the aqueous solution located between adjacent ones of the plurality of plates from leaking out of the cell.

In exemplary embodiments, method may further comprise assembling the cell such that the at least one seal may comprise a relatively hard plastic portion with a first thickness for maintaining the predetermined distance between adjacent plates, and a relatively soft rubber portion with a second thickness for maintaining the substantially air tight and substantially water tight seal between adjacent ones of the plurality of plates.

In exemplary embodiments described herein, the method may further comprise pumping the aqueous solution from the tank to the cell and back into the tank.

In exemplary embodiments described herein, the method may further comprise scrubbing the gas mixture to remove at least a portion of the moisture and/or electrolyte from the gas mixture.

In exemplary embodiments described herein, the method may further comprise controlling the electrolysis process by applying a pulse width modulated voltage to the cell to generate the gas mixture within the cell. In exemplary embodiments, the method my further comprise regulating the current provided to the cell by controlling the duty cycle of the pulse width modulated voltage. In exemplary embodiments, the duty cycle may be controlled in real time and/or substantially real time.

In exemplary embodiments described herein, the method may further comprise outputting the gas mixture to the internal combustion engine.

In exemplary embodiments described herein, the method may further comprise inputting the gas mixture into the tank prior to outputting it to the internal combustion engine. In exemplary embodiments, the method may further comprise outputting the gas mixture to the internal combustion engine without inputting it into the tank.

In exemplary embodiments described herein, the method may further comprise generating a flow of aqueous solution from the tank at a first flow rate and a flow of aqueous solution into the cell at a second flow rate different than the first flow rate. In exemplary embodiments described herein, the second flow rate may be less than the first flow rate. In exemplary embodiments, the flow ratio may be greater than (or less than) 0.25-5:1, such as 0.25:1, 0.50:1, 0.75:1, 0.1:1, 1.25:1, 1.50:1, 1.75:1, 2:1, 2:5:1, 3:1, 3.5:1, 4:1, or 4.5:1, etc.

In exemplary embodiments described herein, the method may further comprise cooling the aqueous solution via a radiator. In exemplary embodiments, the radiator may be configured to cool the aqueous solution exiting the cell before it returns to the tank. In exemplary embodiments, it may be desirable to keep the aqueous solution under 20° C., 30° C., 40° C., 50° C., 60° C., 70° C., or 80° C., etc.

In exemplary embodiments described herein, the method may further comprise manufacturing the tank of a material that is non-conductive.

In exemplary embodiments described herein, the method may further comprise providing an electrolyte selected from the group consisting of: KOH, NaOH, Na2CO3, NaHCO3, NaCl, K2CO3, KHCO3, H2SO4, and CH3COOH.

In exemplary embodiments described herein, the method may further comprise selecting a tank such that the aqueous solution occupies less than ¼, ⅓, ½, ⅔, or ¾, the volume of the tank during operation. In exemplary embodiments, the tank may have a capacity of 2, 3, 4, 5, 6, 7, 8, 9, or 10 liters. For larger applications, the tank may be even larger or in exemplary embodiments, there may be multiple tanks.

In exemplary embodiments described herein, the method may further comprise assembling the cell with at least two plates, a first plate configured to be coupled to a positive terminal of a voltage source and a second plate configured to be coupled to a negative terminal of the voltage source.

In exemplary embodiments described herein, the method may further comprise assembling the cell with at least one neutral plate configured in a series relationship to the first positive terminal plate and the second negative terminal plate.

In exemplary embodiments described herein, the method may further comprise assembling the cell with at least 2, at least 3, at least 4, at least 5, at least 6, at least 7, at least 8, at least 9, at least 10, at least 11, at least 12, at least 13, at least 14, or at least 15 neutral plates. In exemplary embodiments, the number of neutral plates may be selected to obtain a desired voltage drop between the plates.

In exemplary embodiments described herein, the method may further comprise positioning the soft rubber portion of the seal on an inner edge of the hard plastic portion of the seal.

In exemplary embodiments described herein, the method may further comprise positioning the soft rubber portion on the outer edge of hard plastic portion.

In exemplary embodiments described herein, the method may further comprise selecting a seal that comprises at least two soft plastic portions—a first soft plastic portion may be located between the interface of the hard plastic portion and a first one of the adjacent plates and a second soft plastic portion may be located between the interface of the hard plastic portion and a second one of the adjacent plates.

In exemplary embodiments described herein, the method may further comprise surrounding the hard plastic portion of the seal with the soft rubber portion of the seal.

In exemplary embodiments described herein, the method may further comprise selecting the thickness of the soft rubber portion such that it may be larger than the thickness of the hard plastic portion of the seal.

In exemplary embodiments described herein, the hard plastic portion may be 0.002", 0.003", 0.004", 0.005", 0.006", 0.007", 0.008", 0.009", 0.010", 0.0125", 0.025", 0.0375", 0.050", 0.0625", or 0.075" thick.

In exemplary embodiments described herein, the soft rubber portion may be 0.002", 0.003", 0.004", 0.005", 0.006", 0.007", 0.008", 0.009", 0.010", 0.011", 0.012", 0.13", 0.014", 0.030", 0.038", 0.055", 0.0675", or 0.080" thick.

In exemplary embodiments described herein, the method may further comprise manufacturing the hard plastic portion from a material selected such that the hard plastic portion does not significantly react with the aqueous solution.

In exemplary embodiments described herein, the method may further comprise manufacturing the hard plastic portion from high density polyethylene (HDPE), polyphthalamide (PPA), styrene, or combinations thereof.

In exemplary embodiments described herein, the method may further comprise manufacturing the soft rubber portion from a material selected such that the soft rubber portion does not significantly react with the aqueous solution.

In exemplary embodiments described herein, the method may further comprise manufacturing the soft rubber portion from ethylene propylene diene monomer (EPDM).

In exemplary embodiments described herein, the method may further comprise providing the gas mixture to an internal combustion engine that may be a turbocharged diesel engine and inputting the gas mixture into the turbocharged diesel engine up stream of a turbo fan.

In exemplary embodiments described herein, the method may further comprise sensing excess liquid and/or moisture in the form of foam in the gas stream and shutting-off the electrolysis process to prevent the excess moisture from entering the internal combustion engine, and/or the accumulation of the gas mixture.

In exemplary embodiments described herein, a system for generating a gas mixture for use with an internal combustion engine may be provided. The system may comprise:
a tank configured to store an aqueous solution consisting essentially of water and a predetermined quantity of electrolyte;
a cell configured for aiding in electrolysis of the aqueous solution, the cell comprising:
a plurality of plates arranged substantially parallel to one another, the plurality of plates being spaced substantially equidistant from an adjacent one of the plurality of plates; and
at least one seal located between the plurality of plates to create a substantially air tight and substantially water tight seal between adjacent ones of the plurality of plates to aid in preventing the aqueous solution located between adjacent ones of the plurality of plates from leaking out of the cell, the at least one seal comprising:
a relatively hard plastic portion with a first thickness for maintaining the distance between adjacent plates, and
a relatively soft rubber portion with a second thickness for maintaining the substantially air tight and substantially water tight seal between adjacent ones of the plurality of plates;
a pump configured to circulate the aqueous solution between the tank and the cell and back into the tank;
a scrubber for removing at least a portion of the moisture and electrolyte from the gas mixture;
a controller configured to apply a pulse width modulated voltage to the cell to generate the gas mixture within the cell;
an output for outputting the gas mixture to the internal combustion engine;
wherein the gas mixture is input into the tank prior to being output to the internal combustion engine.

In exemplary embodiments described herein, a system for generating a gas mixture for use with an internal combustion engine, the system comprising:
a tank configured to store an aqueous solution consisting essentially of water and a predetermined quantity of electrolyte;
a cell configured for aiding in electrolysis of the aqueous solution, the cell comprising:
a plurality of plates arranged substantially parallel to one another, the plurality of plates being spaced substantially equidistant from an adjacent one of the plurality of plates; and
at least one seal located between the plurality of plates to create a substantially air tight and substantially water tight seal between adjacent ones of the plurality of plates to aid in preventing the aqueous solution located between adjacent ones of the plurality of plates from leaking out of the cell;
a pump configured to circulate the aqueous solution between the tank and the cell and back into the tank;
a scrubber for removing at least a portion of the moisture and electrolyte from the gas mixture;
a controller configured to apply a pulse width modulated voltage to the cell to generate the gas mixture within the cell;
an output for outputting the gas mixture to the internal combustion engine;
wherein the gas mixture is input into the tank prior to being output to the internal combustion engine,
wherein the flow of aqueous solution from the tank is at a first flow rate and the flow of aqueous solution into the cell is at a second flow rate different than the first flow rate.

DETAILED DESCRIPTION OF THE DRAWINGS

Exemplary embodiments will now be described, by way of example, with reference to the accompanying drawings in which.

Figure 9A:
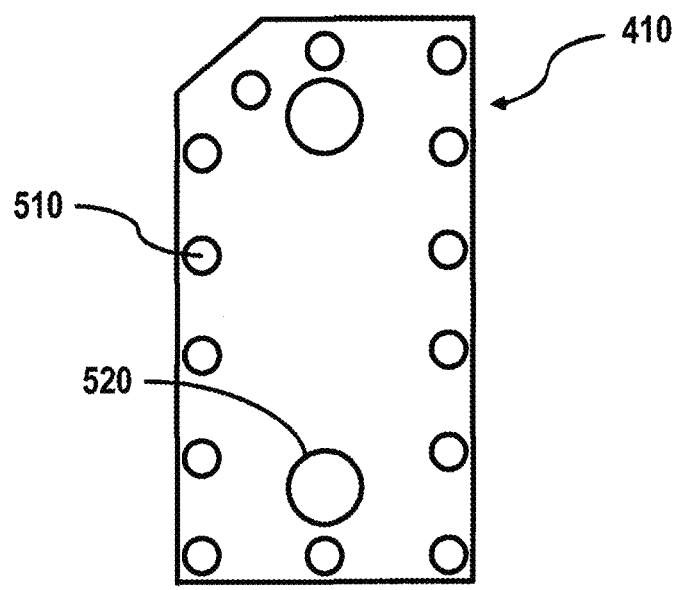
Figure 9B:
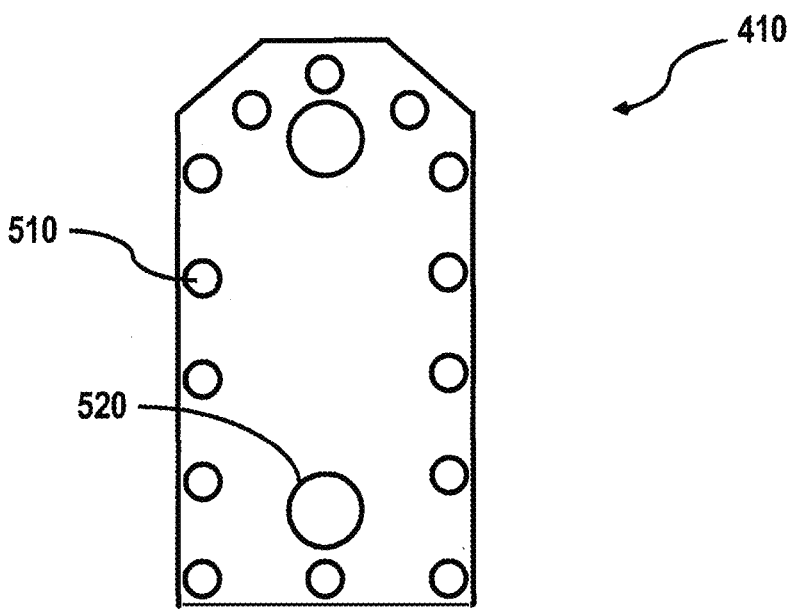
Figure 9E:
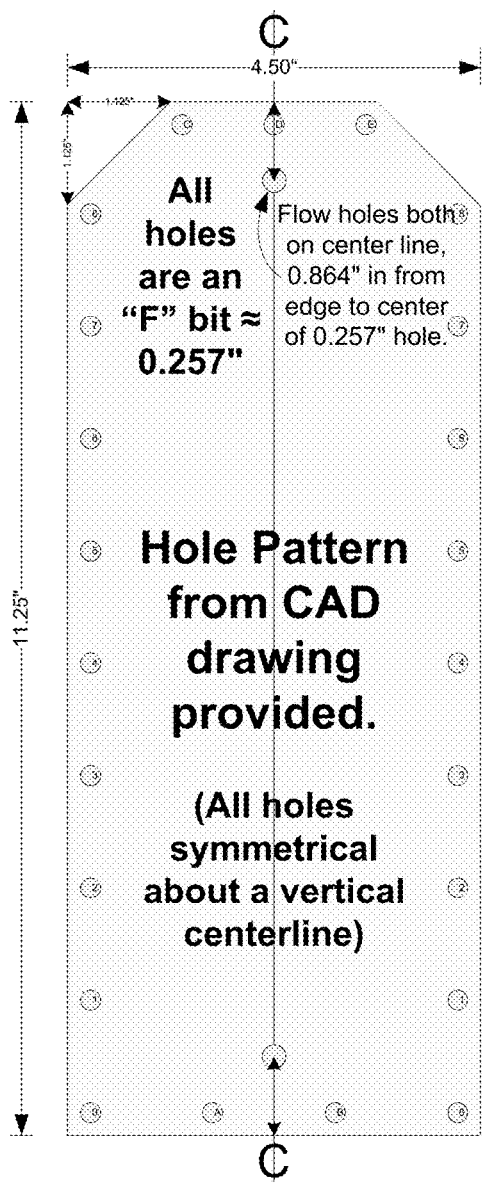
Figure 9F:
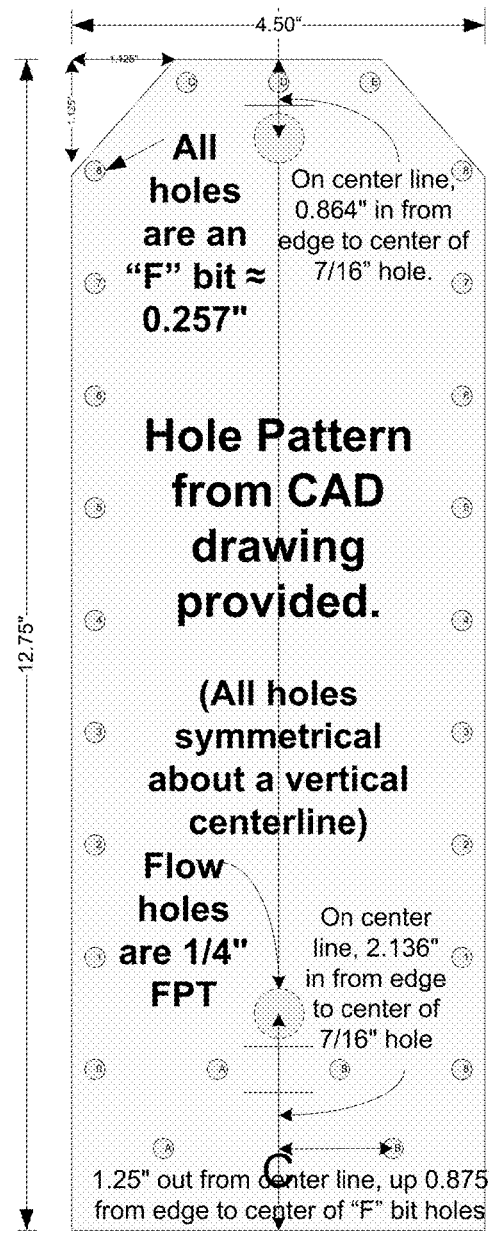
Figure 10A:
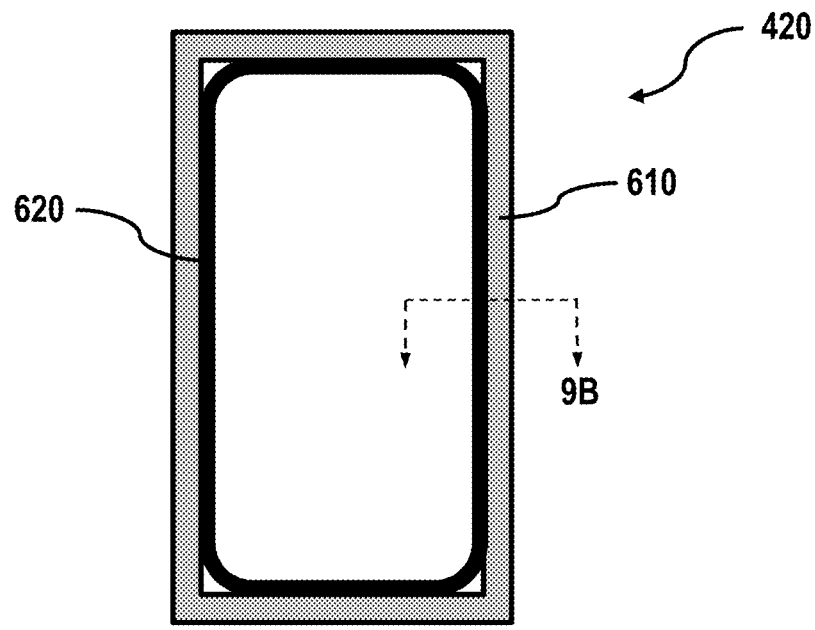
Figure 10B:
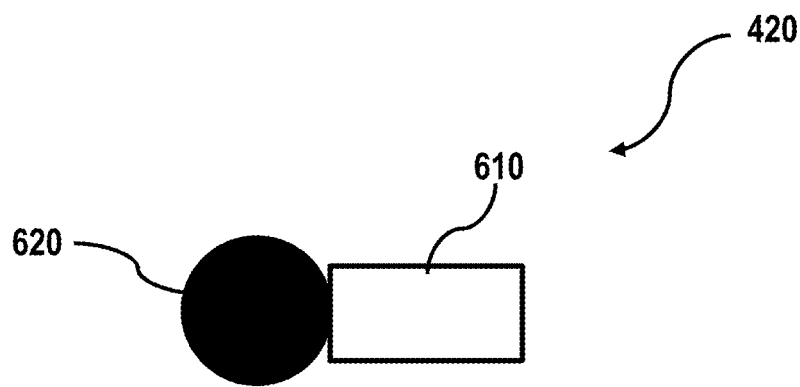

FIGS. 9A-9F are schematic diagrams of alternative designs for plates used in an electrolytic cell for use with a gas mixture generation system in accordance with exemplary embodiment described herein; and FIGS. 10A-10C are schematic diagrams of an exemplary embodiment of a seal for used in an electrolytic cell for use with a gas mixture generation system in accordance with exemplary embodiment described herein.

DETAILED DESCRIPTION OF THE DISCLOSURE

In operation, internal combustion engines (e.g., diesel engines) generally do not use all of the fuel provided to the cylinders in each cycle. In other words, they do not convert all of the energy available in the fuel because the combustion of the fuel may be incomplete. In many cases, the result of incomplete combustion may be a loss of fuel efficiency and/or hydrocarbon pollution.

Exemplary embodiments described herein may be used to alter the combustion (e.g., diesel combustion) chemistry of an internal combustion engine to reduce particulate formation. Exemplary embodiments described herein may be used to increase the concentration of an oxidizer in an internal combustion engine. Exemplary embodiments described herein may be used as a mechanism for distributing the oxidizer for a more even air/fuel mixture. Exemplary embodiments described herein may be used to generate a gas mixture, such as a gas mixture having one or more aqueous solution electrolysis components, that is an accelerant to speed combustion, enhance combustion, alter combustion, change the combustion pattern, alter the flame propagation within the combustion chamber, enhance the initiation of combustion, time of combustion and/or extent of combustion and/or increase combustion completion. Exemplary embodiments described herein may be used to displace air with oxygen and/or hydrogen within the engine's intake system. Exemplary embodiments described herein may be used to create a shorter combustion process that may lower the engine temperature thereby reducing the formation of uncombusted byproducts and/or nitrogen oxides (NOx).

Exemplary embodiments described herein may generate an optimized or partially optimized quantity of gas mixture into the engine's intake for improved combustion. In exemplary embodiments, the system may generate at least 0.01 liters of gas mixture per minute for each liter of engine displacement, for example, at least 0.025, such as at least 0.05, at least 0.075, at least 0.1, at least 0.2. at least 0.3, at least 0.4, at least 0.5, at least 0.6, at least 0.7, or at least 0.75 liters of gas mixture per minute for each liter of engine displacement. In exemplary embodiments, the system may generate in the range of between 0.01-0.75 liters of gas mixture per minute for each liter of engine displacement, for example between 0.01-0.1, such as between 0.01-0.2, between 0.01-0.3, between 0.01-0.4, between 0.01-0.5, between 0.01-0.6, between 0.01-0.03, between 0.02-0.04, between 0.03-0.05, between 0.05-0.075, between 0.075-0.1, between 0.1-0.15, between 0.1-0.2, between 0.1-0.3, between 0.1-0.5, between 0.1-0.7, between 0.015-0.2, between 0.2-0.3, between 0.2-0.4, between 0.2-0.6, between 0.3-0.4, between 0.4-0.5, between 0.4-0.7, between 0.45-0.55, between 0.5-0.6, between 0.55-0.75, between 0.6-0.7, or between 0.65-0.75 liters of gas mixture per minute for each liter of engine displacement.

Exemplary embodiments described herein may generate an ionized gas mixture of oxygen and hydrogen that at least partially bind to fuel droplets (e.g., diesel fuel droplets). The increased availability of an oxidizer (e.g., atomic oxygen) may aid the combustion process which may help achieve a more complete combustion within the internal combustion engine. The presence of the gas mixture may accelerate the burning of the fuel to completion. Since the fuel burns faster, there may be less leftover, un-burnt fuel at the end of a combustion cycle. In exemplary embodiments, un-burnt fuel may be reduced by more than 5%, for example reduced by more than 10%, such as reduced by more than 15%, more than 20%, more than 25%, more than 30%, more than 35%, more than 40%, more than 45%, more than 50%, more than 55%, more than 60%, more than 65%, more than 70%, more than 75%, more than 80%, more than 85%, more than 90%, more than 95%, or more than 100%. In exemplary embodiments, un-burnt fuel may be reduced in the range of between 5-100%, for example, in between 5-25%, between 5-50%, between 5-75%, between 10-30%, between 10-60%, between 10-90%, between 25-40%, between 25-65%, between 25-80%, between 40-60%, between 40-75%, between 40-90%, between 50-70%, between 50-95%, between 60-80%, between 60-100%, between 75-95%, between 80-100%, or between 90-100%.

To generate the gas mixture, in exemplary embodiments described herein, water may be mixed with a reagent (or electrolyte or mixture of electrolytes) and subjected to an electrolysis process. Since pure water itself is an insulator, the reagent is selected to increase the electrical conductivity of the water and/or may be selected to avoid freezing, deposits, residue, and/or other factors. The water-reagent mixture flows through an electrolytic cell to generate a gas mixture. In exemplary embodiments, the gas mixture may be a plasma or a low temperature plasma. In exemplary embodiments, the plasma may be an oxygen rich plasma. The gas mixture is injected into an internal combustion engine (e.g., into or upstream of the turbofan of a diesel engine) and combines with fuel in the engine cylinder. It is believed that there are qualities of the gas mixture, for example, increased density of oxygen in the gas mixture, and/or the addition of the hydrogen, that aid in achieving a more complete combustion of the fuel (e.g., diesel fuel) in the engine cylinder.

In exemplary embodiments described herein the system may be assembled on a vehicle (e.g., a diesel powered truck). The system may include a tank with a low resistance fluid such as water combined with a salt or something similar. The system may be mounted on the truck or in the engine bay of the truck. The system may be a self contained system or one that is comprised of several pieces. In exemplary embodiments, the system may comprise a electrolytic cell and a pump for pumping the low resistance solution into the cell. At one end and out of the cell at the other end. Direct or alternating current (e.g., a square wave) may be applied to metal plates within the cell to accomplish electrolysis of the water. The low resistance fluid and the gas mixture generated by electrolysis may be returned to the tank and the gas mixture may be delivered to the engine of the vehicle. In exemplary embodiments, the system may also comprise a scrubber to aid in separating the fluid from the gas mixture and/or preventing the fluid from entering the engine of the vehicle. For example, the scrubber might have a contact switch which might turn the system off when a predetermined amount of moisture is detected. In exemplary embodiments, the system may also comprise a flow diversion mechanism for creating different flows between the input of the pump and the input to the cell. In exemplary embodiments the system may also comprise a radiator for cooling the low resistance fluid. In exemplary embodiments, the system may also comprise components to aid in the reduction of foam. For example, the system may comprise a bubble buster for breaking bubbles as they enter the tank from the cell and/or energy recovery tubes for creating a vacuum above the surface of the fluid in the tank.

In operation a user might start the vehicle which would also trigger the system described herein to turn on. The system apply the energy to the cell to perform electrolysis on the fluid located within the cell. As the fluid circulates between the tank and the cell, it carries the gas mixture created by the electrolysis process back into the tank and then out to the engine of the vehicle. In exemplary embodiments, once the user turns the vehicle engine off, the system also turns off. In this manner, substantially no gas mixture would be produced when the engine was not running. In exemplary embodiments, the user may periodically refill the system with the low resistance fluid to maintain a particular amount of fluid within the system.

Figure 1:
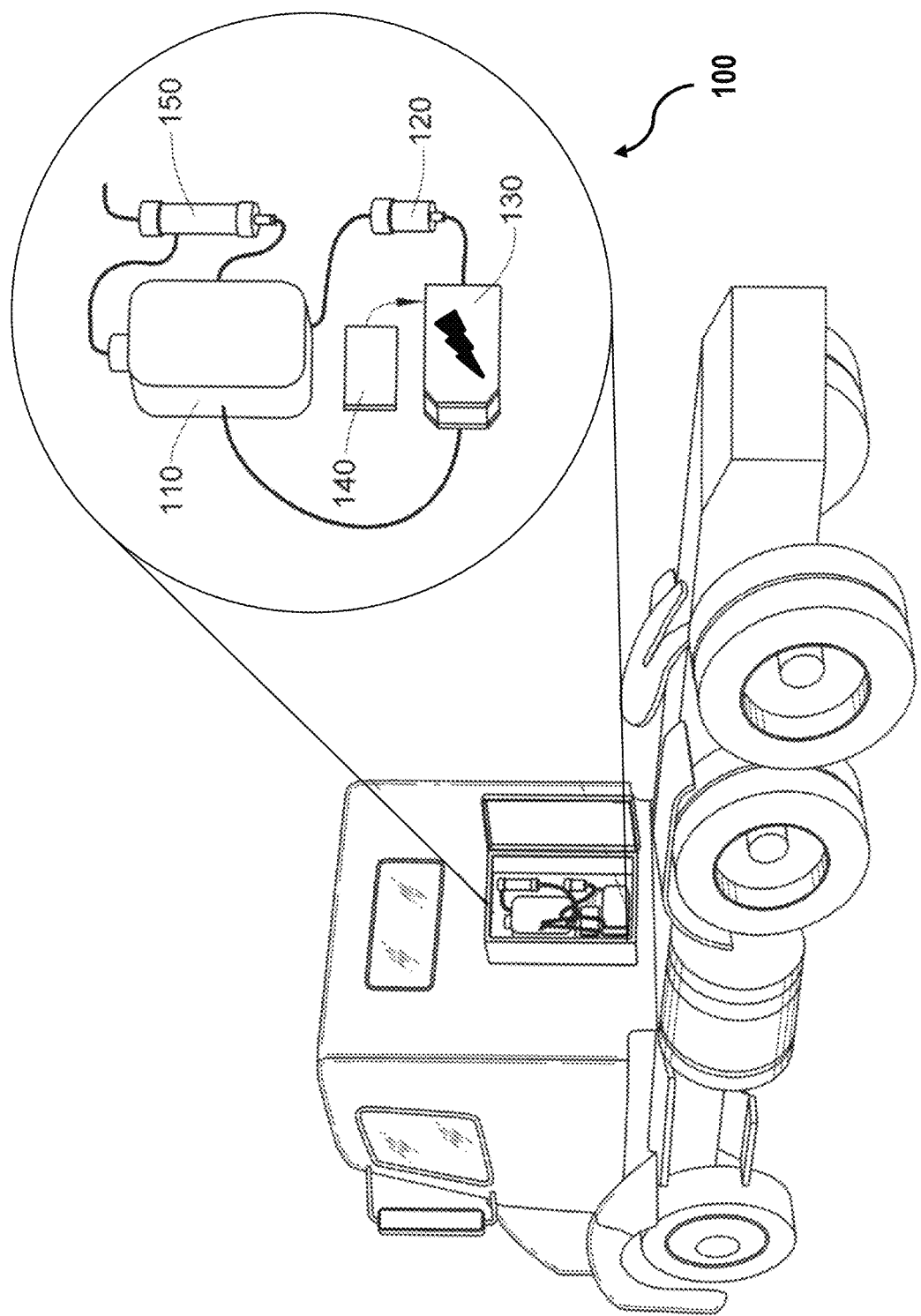
FIG. 1 is a schematic of a gas mixture generation system installed on a vehicle in accordance with exemplary embodiments described herein.
Figure 2:
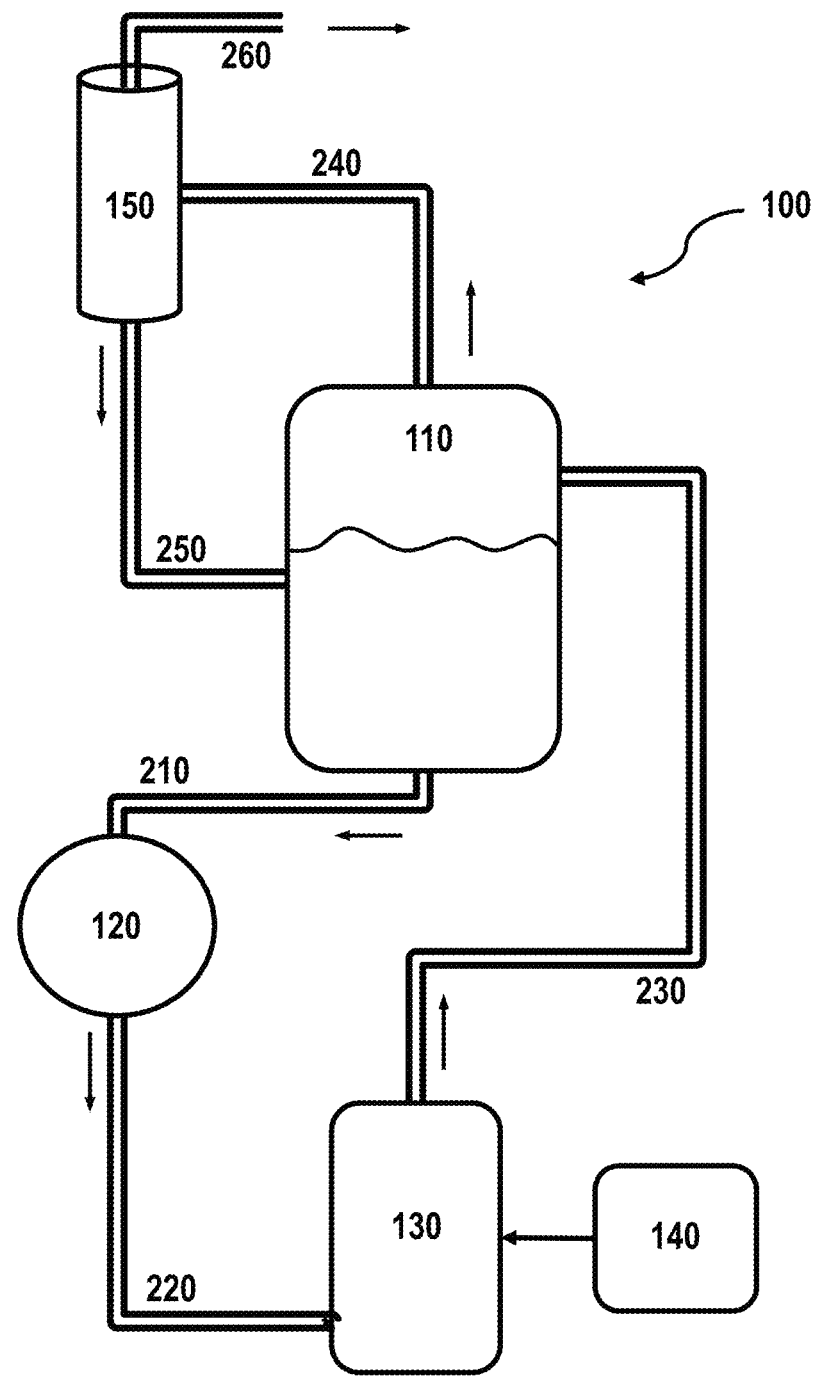
FIG. 2 is a schematic diagram of a gas mixture generation system in accordance with exemplary embodiments described herein.

Exemplary embodiments described herein may utilize a gas mixture generation system such as the system illustrated in FIGS. 1 and 2. The system 100 illustrated in FIGS. 1 and 2 comprises a tank 110, a pump 120, an electrolytic cell 130, a controller 140, and a scrubber 150. FIG. 1 illustrates an exemplary embodiment of a system 100 installed on a vehicle. FIG. 2 illustrates a more detailed exemplary embodiment of a system 100. As illustrated in FIG. 2, the tank 110 holds the water-reagent mixture. In exemplary embodiments, the reagent may be e.g., potassium hydroxide (KOH), sodium chloride (NaCl), NaOH, $Na_2CO_3$, NaHCO3, NaCl, K2CO3, KHCO3, $H_2SO_4$, $CH_3COOH$ and/or mixtures of two, three or more of these reagents to provide a solution that aid electrolysis that may also address other design concerns, including some or all of the following anti-freeze, anti-deposit, anti-clogging, anti-residue, anti-evaporation, anti-corrosion, anti-leaking. In exemplary embodiments, the mixture may be distilled water with a reagent, for example a salt, e.g., KOH or a mixture of KOH and NaOH, as the conductive material mixed in and the mixture may be in the range of between 1-25 tablespoons of KOH mixed with 1 gallon of water (e.g., distilled water), e.g., at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, or at least 20 tablespoons of KOH mixed with 1 gallon of water (e.g., distilled water). In exemplary embodiments, the tank 110 may be a 6 quart tank and may be approximately half-full when the system is operating. In exemplary embodiments, the size of the tank may be in the range of between 0.5-100 quarts, such as at least 0.5 quarts, at least 1 quart, at least 2 quarts, at least 3 quarts, at least 4 quarts, at least 5 quarts, at least 6 quarts, at least 7 quarts, at least 8 quarts, at least 9 quarts, at least 10 quarts, at least 20 quarts, at least 30 quarts, at least 40 quarts, or at least 50 quarts. In exemplary embodiments, the tank may be at least 0.25 full, at least 0.33 full, at least 0.50 full, or at least 0.75 full.

As illustrated in FIG. 2, the tank 110 is fluidly coupled to the pump 120 via a hose 210. The pump 120 is fluidly coupled to the electrolytic cell 130 via tube 220 and the electrolytic cell 130 is, in turn, fluidly coupled back to the tank 110 via tube 230. As would be readily understood by a person of ordinary skill in the art, the tubes illustrated throughout this specification could be one or more tubes. The tubes may be rigid and/or flexible depending on various design choices and the tubes can be made of a variety of materials, such as piping, including small-gauge tubing, high-pressure tubing high-temperature tubing, anti-corrosive tubing and/or heat-resistant piping. In exemplary embodiments, the materials may be selected to reduce and/or minimize the reactivity of the tubes or other components with the gas mixture and/or the water-reagent mixture. In exemplary embodiments, the tubing may be a commercially available polyurethane product called superthaneether.

In exemplary embodiments, the pump 120 may be e.g., a 12 volt surge pump such as the types that are readily available off-the-shelf. In exemplary embodiments, the pump may be capable of pumping at least 0.25 gallons/minute, at least 0.50 gallons/minute, at least 0.75 gallons/minute, at least 1.00 gallon/minute, at least 1.25 gallons/minute, at least 1.50 gallons/minute, at least 1.75 gallons/minute, or at least 2.00 gallons/minute, etc.

In exemplary embodiments, the water-reagent mixture may be fed into an electrolytic cell 130 via the pump 120 during operation. The cell 130 may be subjected to an electrical voltage and current to convert the water into oxygen and hydrogen gas via a process known as electrolysis. The output of the electrolytic cell 130 may be the water-reagent mixture and the newly formed gas mixture both of which are delivered back to the tank 110 in a substantially closed loop. In exemplary embodiments, the substantially closed-loop system may reduce the loss of the water- reagent mixture thereby reducing the frequency at which addition fluid needs to be added to the system. In exemplary embodiments, the system may not be substantially closed. In exemplary embodiments, the electrolytic cell may be a dry cell, a wet cell, and/or a hybrid between the two designs. In exemplary embodiments, the water-reagent mixture may be added to the system with varying frequency, e.g., less than 0.50 cups per 1000 miles, such as less than 1 cup per 1000 miles, less than 1.50 cups per 1000 miles, less than 2 cups per 1000 miles, less than 2.50 cups per 1000 miles, or less than 3 cups per 1000 miles or streaming through the system, for example, in a marine application where no holding tank is necessary and the body of water supporting the vessel may be sufficiently conductive to undergo electrolysis within the generator.

As the gas mixture accumulates in tank 110, it may be output to scrubber 150 via tube 240. Scrubber 240 may dry the gas mixture by separating it from the water and/or reagents. The gas mixture may be sent to the engine (e.g., upstream of a turbofan) via tube 260 and the water and reagent are returned to the tank via tube 250. Although the tube 250 is shown delivering the water and reagent back to the tank below the water line, it may also do so above the water line within the tank 110. The process may be controlled by the controller 140 which is shown in FIG. 2 being coupled to the electrolytic cell 130 but could also be coupled to other portions in exemplary embodiments described herein (e.g., scrubber 140, pump 120, and/or tank 110).

In exemplary embodiments, the scrubber 150 may be assembled using a substantially chemically resistant and/or substantially sealed vessel with at least three ports as described above. The scrubber 150 may be filled with plastic bristles and the port on the top of the tank 150 may be connected with tubing 240 to the port on the side of the scrubber 150. The port at the bottom of the scrubber 150 may be connected to the port below the water line of the tank 110 and the port at the top of the scrubber 150 may be connected with tubing 260 to the internal combustion engines air intake system (e.g., upstream of the turbofan of a turbocharged diesel engine).

In exemplary embodiments, the top of the scrubber may include a rubber cap (pop off) which may be configured to relieve the trapped gas mixture from the system e.g., in the event there is a flash back and/or a buildup of undesirable pressure. In exemplary embodiments, the gas mixture exits the top of the scrubber through tube 260 and may be delivered to a venturi shaped delivery fitting inside the intake tube prior to the intake of the internal combustion engine. The venturi shaped fitting may create a slight vacuum which may assist in moving the gas mixture from scrubber 150 to the intake.

In exemplary embodiments, the system 100 may utilize distilled water and the reagent may be KOH. The KOH (or other reagent) may be used to decrease the amount of electrical energy required by the electrolytic cell 130 to break the oxygen-hydrogen bond in the water molecules during electrolysis and/or enable current to pass through the water to separate the water molecules into component parts. Pump 120 pumps the water-reagent mixture into the electrolytic cell 130 and the electricity supplied by the controller 140 to the electrolytic cell 130 is used to break the oxygen-hydrogen bond in the water molecules. The result is gaseous oxygen and hydrogen which in exemplary embodiments, may be ionized. Cell 130 may consist of numerous metal plates positioned such that each plate is substantially parallel to its adjacent plate and/or plates.

In exemplary embodiments, the system may comprise a safety protocol implemented through logic within the controller 140. For example, in exemplary embodiments, a signal may be generated within the controller to control whether power is delivered to pump 120 and/or electrolytic cell 130. The signal may be generated if e.g., a sensor in scrubber 150 indicates normal operation and oil pressure is available in the internal combustion engine. If the signal is not generated, pump 120 may be shutdown and the electrolytic cell 130 may not be powered. In exemplary embodiments, such a safety protocol may be desirable to avoid the production of the gas mixture when the internal combustion engine is not running. In particular, the electrolysis process creates oxygen and hydrogen gas which is readily combustible. Accordingly, if the gas is not being consumed by the internal combustion engine, it may need to be safely stored to avoid an unintended combustion of the gas mixture. Accordingly, in exemplary embodiments, the safety protocol may be designed to minimize or eliminate the production of the gas mixture when it is not being consumed by the internal combustion engine.

In exemplary embodiments, the safety protocol may also be desirable as a protection measure for the internal combustion engine. As discussed above, scrubber 150 removes the water and the reagent from the gas. In exemplary embodiments, this removal of the water and/or reagent may be desirable to protect the engine since the water and/or reagent may be harmful to the operation of the engine. Accordingly, in exemplary embodiments, the scrubber may comprise a switch which instructs the controller to turn off the system if excess water (moisture) and/or reagent is detected.

As illustrated in e.g., FIG. 2, in exemplary embodiments described herein, tank 110 may be a chemically resistant, substantially liquid-tight and/or substantially gas-tight vessel with at least four ports at least one port near or at the top, at least one port near or at the bottom, at least one port below the top and above bottom ports along the side above the water line, and at least one port below the top and above bottom ports along the at the side below the water line. In exemplary embodiments, tank 110 may be assembled by connecting the bottom port of tank 110 to the input port of the pump 120 with tubing 210. Although FIG. 2 illustrates the bottom port of tank 110 located at the bottom of the tank, the port may be located anywhere on the tank so long as it permits the water-reagent mixture to be delivered to the downstream components of system 100. Similarly, although tube 230 which returns the gas mixture and water-reagent mixture to the tank is illustrated as being coupled to tank 110 at a port above the water line, in exemplary embodiments, the port may be located at the top of the tank and/or below the water line—e.g., on the side of the tank below the water line and/or at the bottom of the tank. Furthermore, the port at the top of the tank for delivering the gas mixture to the scrubber could be located on the side of the tank.

Figure 3:
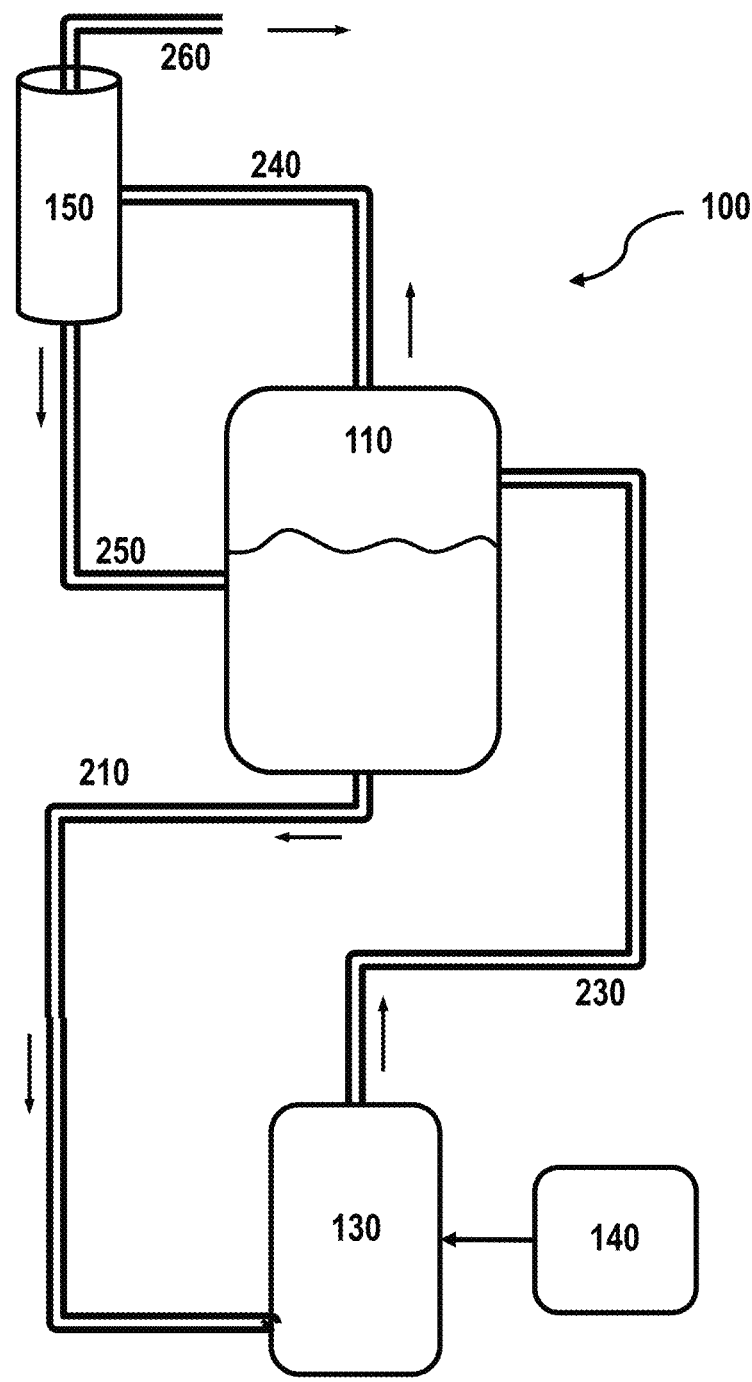
FIG. 3 is a schematic diagram of an alternative gas mixture generation system in accordance with exemplary embodiment described herein.

In exemplary embodiments, pump 120 may be optional. An exemplary system without such a pump is illustrated in FIG. 3. As shown, without pump 120, the output of tank 110 is coupled to the electrolytic cell 130 via tubing 120. In such a situation, the flow of the water-reagent mixture may be accomplished via a gravity fed arrangement. In such an exemplary arrangement, the tank 110 may be positioned about the cell 130. In alternative exemplary embodiments, a pump may be located downstream of the cell 130 or internal to the tank 110.

Additionally, although not shown, in exemplary embodiments, a subsystem may be added to the system to enable the use of non-distilled water or in exemplary embodiment, alternative fluids.

Figure 4:
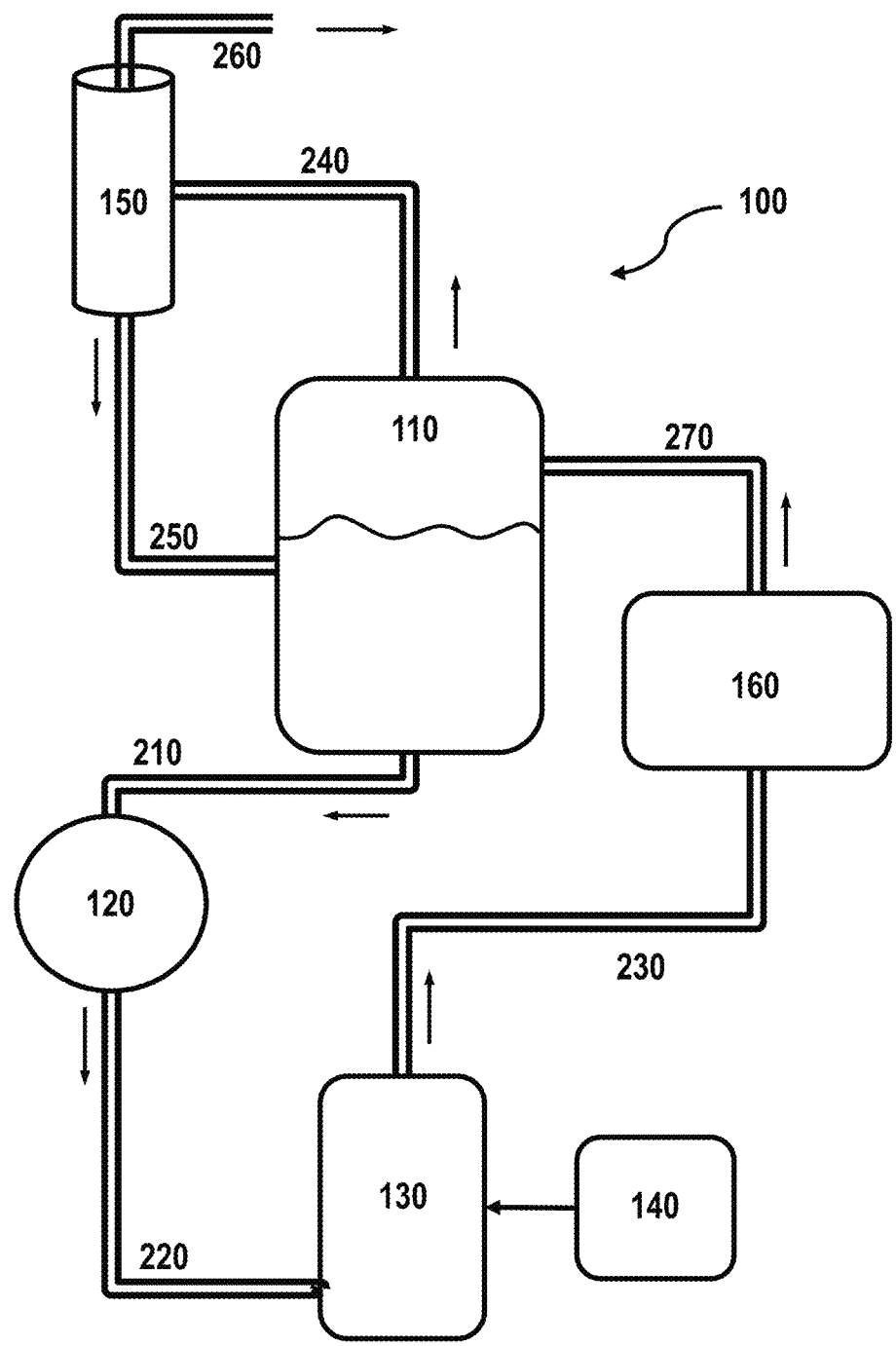
FIG. 4 is a schematic diagram of an alternative gas mixture generation system in accordance with exemplary embodiment described herein.

FIG. 4 illustrates an exemplary embodiment of a system that is similar to the exemplary embodiment described with respect to FIG. 2 except that the exemplary embodiment of FIG. 4 further comprises a radiator 160 coupled between the output of cell 130 and the input of tank 110. In exemplary embodiments, the radiator may be utilized to cool the water-reagent mixture before it reenters the tank. In exemplary embodiments, the electrolysis process generates heat which increases the temperature of the water-reagent mixture. The increase in temperature reduces the resistivity of the water-reagent mixture and in exemplary embodiments, may even cause the water to boil. In exemplary embodiments, it may be desirable to limit the increase in temperature with the use of radiator 160. In exemplary embodiments, the radiator may simply be a series of tubing exposed to a relatively cool air source. For example, in exemplary embodiments, radiator 160 may be located in close proximity to a radiator of an internal combustion engine on a vehicle. Alternatively, the radiator may be located relatively far from the internal combustion engine because of the additional heat generated by the engine. In exemplary embodiments, the radiator may be constructed of substantially rigid plastic piping that is subjected to the ambient temperature of the air to aid in cooling the water reagent mixture. In exemplary embodiments, the radiator may be located in other positions within the system. For example, radiator 160 may be located between tank 110 and pump 120 or between pump 120 and electrolytic cell 130. Alternatively, in exemplary embodiments, radiator 160 may be in its own closed loop with the tank e.g., the radiator may be configured to remove the water-reagent mixture from the tank, cool it, and return the mixture to the tank. In exemplary embodiments, the radiator may be a passive system or an active cooling system (e.g., a refrigeration unit or something similar).

Figure 5:
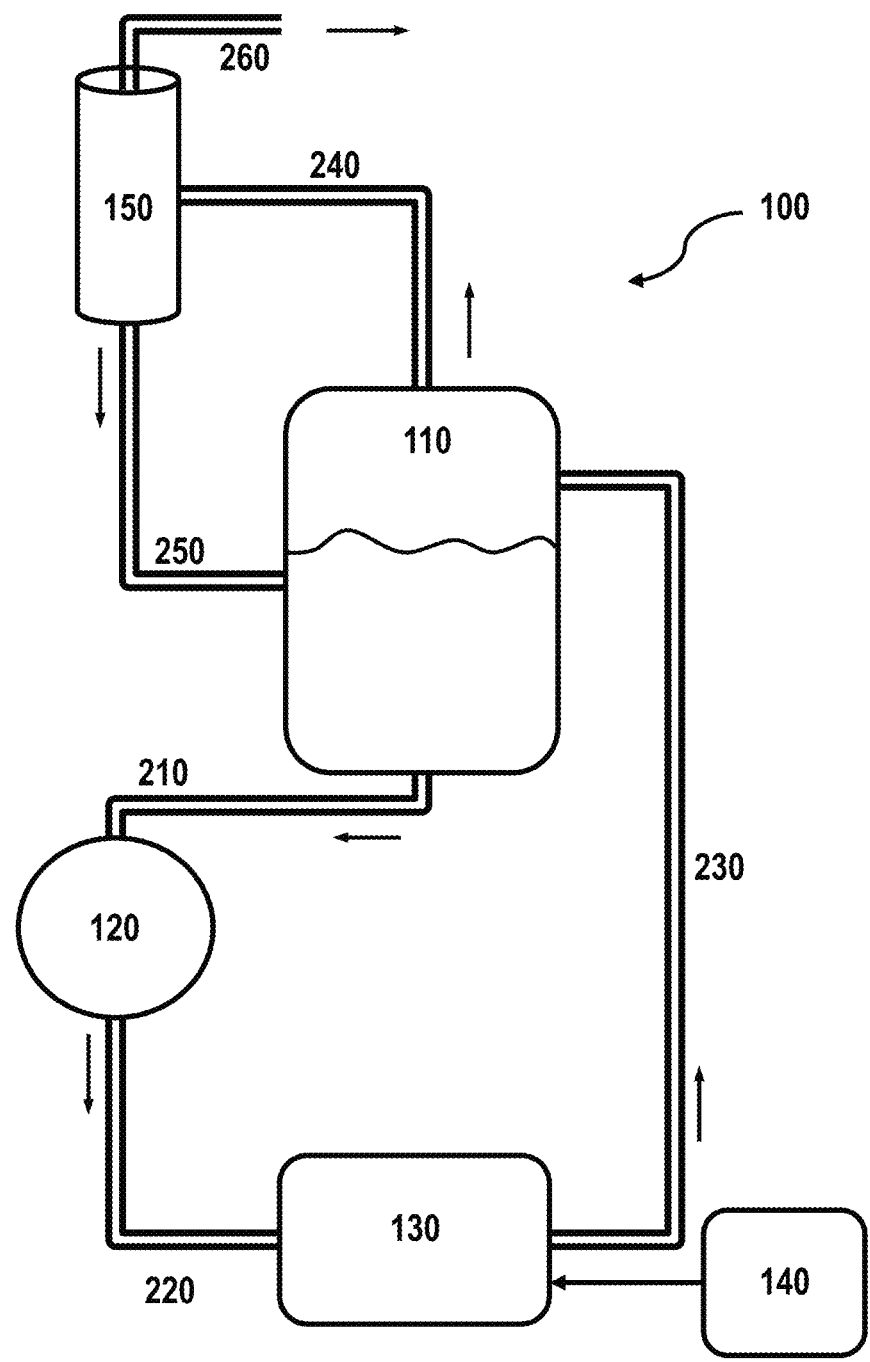
FIG. 5 is a schematic diagram of an alternative gas mixture generation system in accordance with exemplary embodiment described herein.

FIG. 5 illustrates an alternative exemplary embodiment of a system for generating a gas mixture. The exemplary embodiment illustrated in FIG. 5 is similar to the embodiment illustrated in FIG. 2 except the orientation of the electrolytic cell is different. In FIG. 2, cell 130 was illustrated in a substantially vertical position. Accordingly, the water-reagent mixture entered cell 130 at the bottom and it substantially filled cell 130 before exiting cell 130 at the top. In FIG. 5, the cell 130 may be positioned in a substantially horizontal position. In this manner, the water-reagent mixture flows from left to right across the cell. In exemplary embodiments, it may be desirable to use a vertically positioned cell over a horizontally positioned cell or vice versa. For example, it is believed that the electrolysis process is more efficient when the water-reagent mixture covers the maximum surface of each pate within cell 130. In exemplary embodiments maximum (or at least increased) coverage may be obtained with the combination of various cell shapes, sizes, and/or orientations. A more detailed description of the structure of the cell, including the shape of the various plates is provided elsewhere herein.

Figure 6:
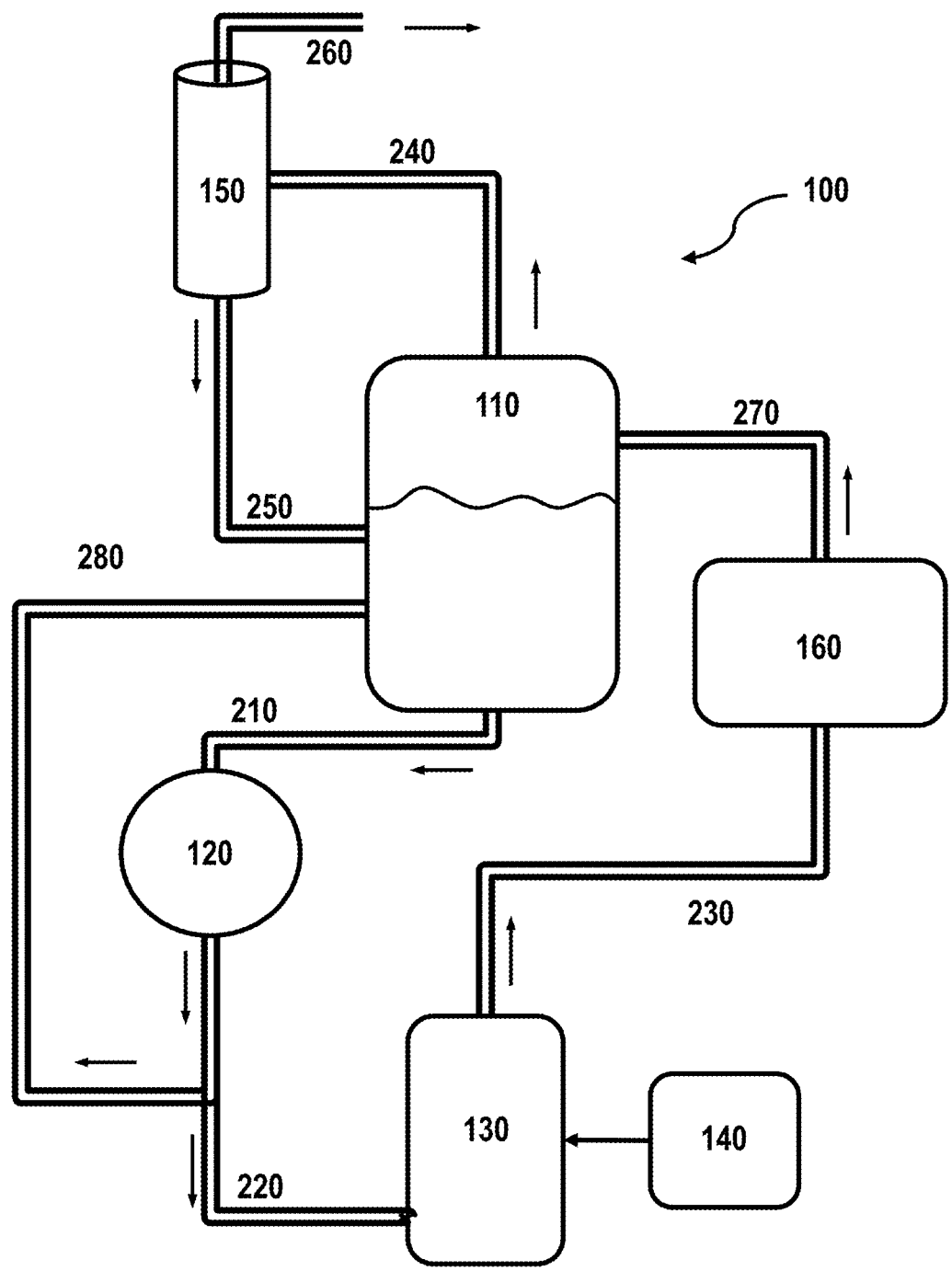
FIG. 6 is a schematic diagram of an alternative gas mixture generation system in accordance with exemplary embodiment described herein.

FIG. 6 illustrates an exemplary embodiment of a system that is similar to the exemplary embodiment described with respect to FIG. 4 except that the exemplary embodiment of FIG. 6 further comprises a flow diversion mechanism 280. In exemplary embodiments described herein, (e.g., FIG. 2), the rate of flow from tank 110 was substantially the same as the rate of flow onto cell 130. However, in exemplary embodiments, that may not always be desirable. In exemplary embodiments, it may be desirable to have a first rate of flow from the tank and a second rate of flow into the cell. In particular, the second flow rate may be faster or slower than the first flow rate. In exemplary embodiments, this arrangement may be desirable because e.g., the slower flow rate into the cell may be advantageous for the electrolysis process but detrimental to the operation of tank 100. The tank may operate more effectively when the flow rate is higher (e.g., to address foaming issues and/or gas composition issues discussed elsewhere herein). Accordingly, in exemplary embodiments, a portion of the water-reagent mixture down steam of pump 120 may be diverted back into the tank before it enters electrolytic cell 130. This maintains a higher flow rate out of tank 110 than into cell 130. In exemplary embodiments, the flow rate from the tank may be 1 gallons/minute while the flow rate into the cell is 0.25 gallons/minute or 1 gallon/minute while the flow rate into the cell is 0.33 gallons/minute or 1 gallon/minute while the flow rate into the cell is 0.50 gallons/minute or 1 gallon/minute while the flow rate into the cell is 0.66 gallons/minute. In exemplary embodiments, the ratio of the flow rate out of the tank to the flow rate into the cell may be at least 1.25:1, at least 1.50:1, at least 1.75:1, at least 2:1, at least 3:1, at least 4:1, at least 5:1, at least 6:1, or at least 7:1, etc.

Figure 7:
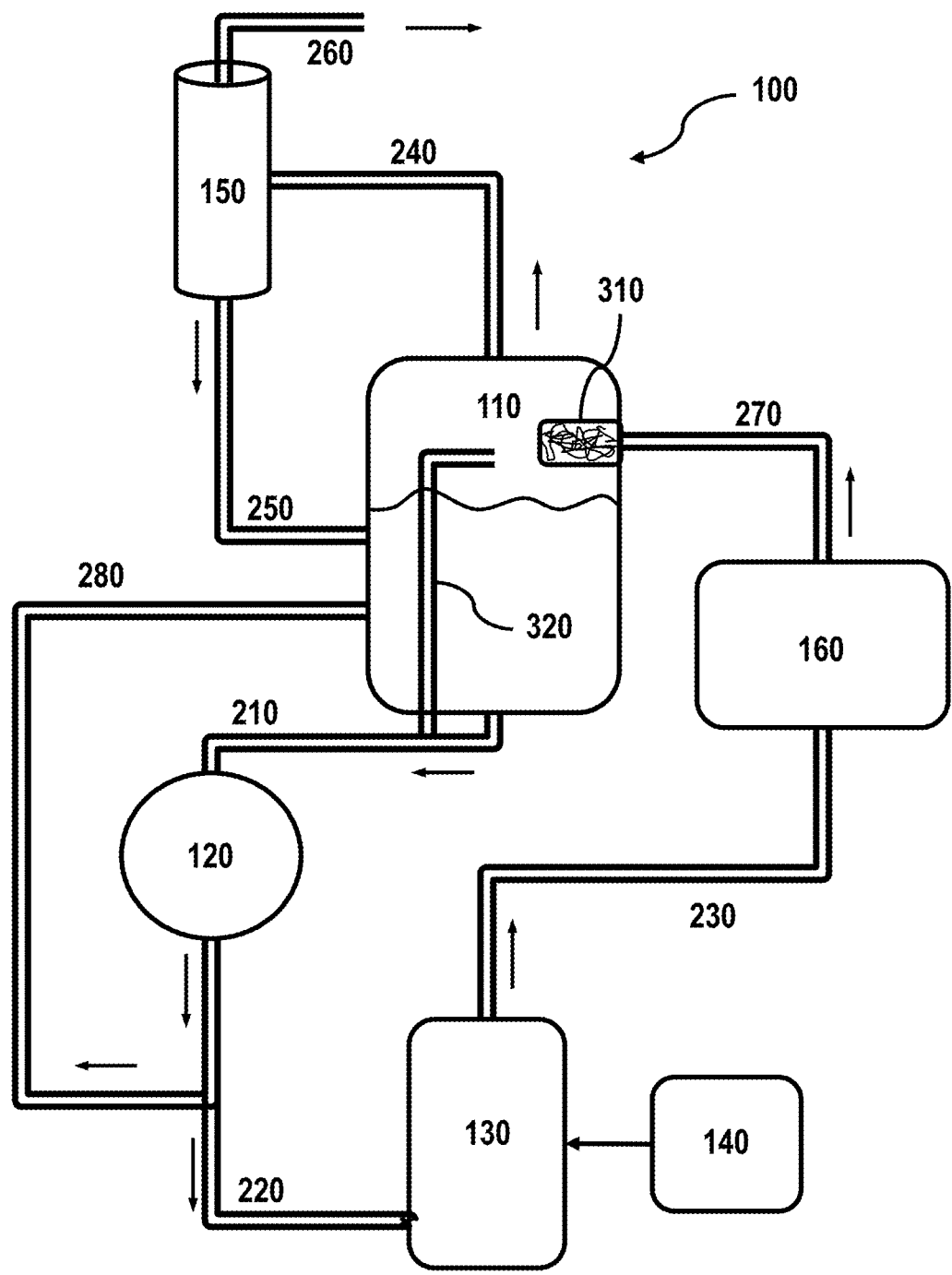
FIG. 7 is a schematic diagram of an alternative gas mixture generation system in accordance with exemplary embodiment described herein.

FIG. 7 illustrates an exemplary embodiment of a system that is similar to the exemplary embodiment described with respect to FIG. 6 except that the exemplary embodiment of FIG. 7 includes components for reducing the amount of foam generated within tank 110. In certain situations, the electrolysis process may generate foam within the system. In exemplary embodiments, the gas mixture and water-reagent mixture may be moved from cell 130 to tank 110 via tubing 230, 270 and be deposited into the tank after first passing thru a bubble buster 310. The bubble buster 310 may be a structure that has increased surface area (similar to a sponge) that may be used to break the surface tension of any bubbles/foam in the returning solution.

In exemplary embodiments, a second foam preventative and removal system may also be utilized. Such a system may be a least one tube known as an energy relief tube or ERT 320 that connects to the face of tank 110 above the level of the aqueous solution. The other end of the tube may be connected to tube 210 upstream of pump 120. In operation, these tubes may assist in reducing the foam off the top of the solution and also aid in preventing foam from forming by creating e.g., a slight vacuum within tank 110.

In exemplary embodiments, a foam retardant may be utilized to reduce foaming. However, in exemplary embodiments, such compositions lose their potency and the foam eventually returns. Some of the retardants that may be appropriate include boric acid, hot tub and/or spa antifoaming agents.

In exemplary embodiments, controller 140 may monitor the current delivered to electrolytic cell 130 using e.g., a constant current source to help ensure that the gas mixture production at electrolytic cell 130 is substantially constant if/when the conductivity of the water-reagent mixture changes as the temperature increases or if additional reagent is added to the system. In exemplary embodiments, the power supplied by controller 140 to electrolytic cell 130 may be about 12V. The voltage delivery may be via a square wave operating at e.g., 0.1 khz, 0.25 khz, 0.5 khz, 0.6 khz, 0.75 khz, 0.85 khz, 1 kHz, 2 kHz, 2.2 kHz, 2.5 kHz, 2.7 kHz, 3 kHz, 3.5 kHz, 4 kHz, 5 khz, 6 kHz, or 6.5 MHz. In exemplary embodiments, controller 140 may use a calibrated shunt to measure the current delivered to electrolytic cell 130.

In exemplary embodiments, controller 140 may be a digital Pulse Width Modulator (PMW) controller which converts e.g., a 12 V DC voltage and delivers a pulsed waveform to the generating cell. In exemplary embodiments, the controller may have an adjustable duty cycle for setting current values according to amperage requirements to regulate the required amount of gas needed for a particular internal combustion engine or a particular engine load or vary with the engine load or vary with the RPM's of the engine or vary as a function of both. In exemplary embodiments, controller 140 may be programmed to maintain the amperage setting through substantially all of the ranges of temperatures of the solution from a cold start up to high operating solution temperatures. In exemplary embodiments, controller 140 may be capable of operating between 0 and 80 amps—e.g., about 5 amps, 10 amps, 15 amps, 18 amps, 20 amps, 22 amps, 25 amps, 30 amps, 35 amps, 40 amps, 50 amps, 60 amps, 70 amps, or 80 amps. Controller 140 may also communicate with the various shut down and safety features, provide information to a remote status indicator for the operator and serve as an automatic on/off switch for the entire system. In exemplary embodiments, the shut down may be triggered by an oil pressure sensor (e.g., an oil pressure sensor placed on an oil line to the turbo). In exemplary embodiments, the presence of the safety feature may be beneficial to ensure that no gas is being produced when the engine is not running to avoid the need for gas storage.

Figure 8:
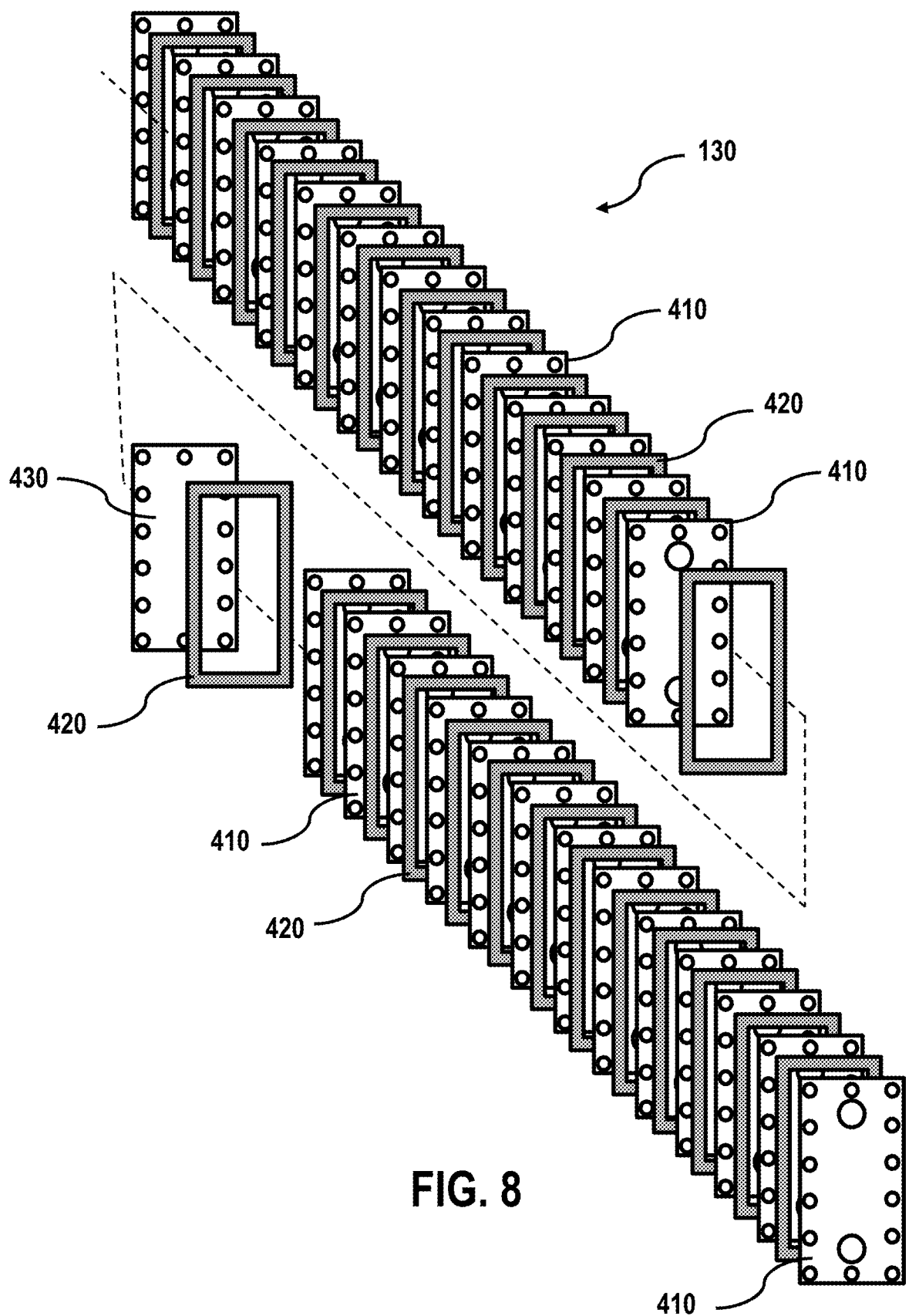
FIG. 8 is a schematic diagram of an electrolytic cell for use with a gas mixture generation system in accordance with exemplary embodiment described herein.

FIG. 8 is an exemplary embodiment of an electrolytic cell 130 that may be used in conjunction with the exemplary embodiments of systems described herein. As illustrated, the cell 130 may comprise 27 stacked and evenly spaced stainless steel plates 410,430 that are separated by seals 420 (e.g., gaskets and/or gaskets with spacers) which when compressed by insulated bolts form a substantial fluid-tight sealed and gas-tight sealed unit.

In exemplary embodiments, the stainless steel plates 410 may have a cross-hatched, diagonal, grooved, and/or etched texture on one or both surfaces. In exemplary embodiments, the addition of texture to the surface of plates 410 may increase the efficiency of the electrolysis process. In exemplary embodiments, the plates may have holes (510 in FIG. 9) to allow the water-reagent mixture to flow between the plates. The plates may be electrically isolated from each other and and/or alternately anodes and cathodes where the anodes are connected to the positive electrical source from controller 140 and the cathodes are connected to the common negative electrical source. In exemplary embodiments, the exterior plates of cell 130 may have tubing ports 520 at one end (e.g., the bottom) to accept the water-reagent mixture from pump 120 and ports 520 at another end (e.g., the top) to output the gas mixture to tank 110. In exemplary embodiments, electrolytic cell 130 may comprise a solid stainless steel plate with no holes 430 that functionally separates electrolytic cell 130 into two separate electrolysis units.

As mentioned above, in exemplary embodiments, the electrolytic cell may comprise 27 stainless steel plates. In this configuration, 1 plate 420 may be solid, 24 plates 410 may be etched with e.g., a crosshatched diagonal lines and holes, and 2 plates 410 (on the ends) may be solid with 2 ports each (e.g., one located at the top and one located at the bottom of the plate). In exemplary embodiments, plates 410 may be staked alternating each layer with an electrically insulating seal 420 in e.g., this order: 1 solid plate with 2 ports, 12 cross-hatched plates, 1 solid plate, 12 cross-hatched plates, and 1 solid plate with 2 ports. The stack of plates may be bolted together with insulated bolts (through holes 510) making a substantially liquid and gas-tight sealed electrolytic cell 130. In exemplary embodiments, the output of pump 120 may be connected with tubing to a y-connector, and both sides of they-connector may be connected with tubing to the 2 lower input ports of cell 130. The 2 output ports of cell 130 may be connected to a y-connector which is in turn connected via tubing to the input port of tank 110 that is on the side of the tank above the water line.

In exemplary embodiments, electrolytic cell 130 may comprise two end pieces made of e.g., UHMW plastic which contain the working parts of the electrolytic cell. In this embodiment, cell 130 may comprise 25 plates made from 18 gauge-316L stainless steel that are separated by seals (e.g., spacer/gaskets) that are about 0.030 inches thick. The cell may oe held together by e.g., 22 SS bolts with e.g., Teflon insulators which prevent the bolt from coming into contact with the plates. The bolts may be torqued to about 13 inch-pounds into SS NYLOCK nuts. In exemplary embodiments, the spacer/gasket system may seal the fluid from exiting the cell and precisely space the SS plates to e.g., 0.020 inches, 0.025 inches, 0.030 inches, 0.035 inches, 0.040 inches, 0.045 inches, or 0.05 inches. In exemplary embodiments, the stainless steel plates may be scuffed to the consistency of heavily honed engine cylinder wall.

In exemplary embodiments, the shape of the plates may be varied. For example, as illustrated in FIG. 8, the plates may be substantially rectangular. In alternative exemplary embodiments, the plates may be have an asymmetric shape such as that illustrated in FIG. 9A or an alternative symmetric shape such as that illustrated in FIG. 9B, in which either one or two of the corners from the rectangular shape have been removed. FIGS. 9C-9F illustrate an exemplary embodiment of plates as discussed above with respect to FIG. 8. In particular, FIG. 9C is an exemplary embodiment of a central (solid) plate that may be used to separate a singular cell into two independent electrolytic cells. FIG. 9D is an exemplary embodiment of an end plate (power plate) that may be used on either end of the cell. FIG. 9E is an exemplary embodiment of a neutral plate such as the ones described above that may be etched and stacked to reduce the voltage drop between the power plates. FIG. 9F is an exemplary embodiment of a nylon end plate that may be used on either end of the cell to enable attachment of the various tubes and ports to the cell. In exemplary embodiment, it may be advantageous and/or desirable to use such an end plate to enable attachment of the tubes to the cell.

In exemplary embodiments, as shown in FIGS. 10A and 10B, the seal 420 may include at least two portions, a relatively hard plastic portion 610 with a first thickness for maintaining the distance between adjacent plates, and a relatively soft rubber portion 620 with a second thickness for maintaining the substantially air tight and substantially water tight seal between adjacent ones of the plurality of plates. In this configuration, when the bolts for cell 130 are tightened, spacer 610 maintains the predetermined distance between the plates while the gasket is squeezed between adjacent plates 410 to create a substantially fluid tight and air tight seal. FIG. 10C is an exemplary embodiment of a seal such as the one described herein showing exemplary dimensions and further details. For example, in the gasket shown in FIG. 10C, the hard plastic portion comprises 23 holes for accommodating the bolts described above for holding the cell together. The Figure also illustrates an exemplary layout for such holes. Of course, the hard plastic portion may not comprise any holes in a situation where it did not overlay with the holes in the plates.

EXAMPLES

The following examples are given as particular embodiments of the disclosure and to demonstrate the advantages thereof. It is understood that the examples are given by way of illustration and are not intended to limit the specification or the claims that follow in any manner.

Vehicle: The following vehicle was employed in the Mileage Test and the Diesel Snap Test detailed below. The vehicle was a manual transmission GMC Box Truck, Model TOPKICK C7H042, having a 6-cylinder, 6.6 L, diesel engine, with a single exhaust (the vehicle herein referred to as "GMC Box Truck"). The GMC Box Truck was fueled with diesel fuel and driven by the same driver, in Mt. Vernon, Washington, in the examples described below.

Example 1

Mileage Test: The GMC Box Truck was fitted with an exemplary embodiment of the system described herein. In particular, the truck was fitted with an embodiment of the system that included a flow diversion mechanism. The vehicle was driven for a total of six cycles of 111.8 miles each, noting the amount of fuel consumed and the miles/gallon for each particular cycle. For the first three cycles, the system was turned on. The opacity of the exhaust was measured at the completion of the third cycle. The system was then turned off, and the remaining three cycles (of the total six cycles) were completed, again measuring the opacity at the end of the sixth cycle (i.e., the third cycle with the system off). The opacity measurements were conducted using a Portable Exhaust Gas Analyzer, Model # 5001 (4&5 Gas) (Emissions Systems, Inc.), having an opacity limit of 55%. The Results of the Mileage Test are shown in Table 1:

TABLE 1

| Cycle | System | Miles Covered | Amount of Fuel Used [gal.] | Miles/gallon | Opacity (%) |
| --- | --- | --- | --- | --- | --- |
| 1 | ON | 111.8 | 8.356 | 13.4 | — |
| 2 | ON | 111.8 | 8.668 | 12.9 | — |
| 3 | ON | 111.8 | 8.798 | 12.8 | 0.37 |
| 4 | OFF | 111.8 | 11.887 | 9.4 | — |
| 5 | OFF | 111.8 | 11.4 | 9.8 | — |
| 6 | OFF | 111.8 | 11.51 | 9.7 | 3.42 |

Example 2

Diesel Snap Test: The opacity of the exhaust from the GMC Box Truck, fitted with an exemplary embodiment of the system described herein. In this test, the system was similar to the system described with respect to FIG. 2. The opacity of the vehicle exhaust was measured after the driver snapped the accelerator a predetermined number of times while the GMC Box Truck is in neutral (having the system either on or off). The opacity measurements were done at a Washington State Emissions Check facility. The results are shown in Table 2:

TABLE 2

| Run | Date | System | # Snaps | Opacity Limit (%) | Opacity Reading (%) |
| --- | --- | --- | --- | --- | --- |
| 1 | STOCK | OFF | 3 | 55 | 71 |
| 2 | Apr. 7, 2010 | ON | 5 | 55 | 13 |
| 3 | Apr. 9, 2010 | ON | 3 | 55 | 7 |
| 4 | Apr. 9, 2010 | ON | 3 | 55 | 11 |
| 5 | May 6, 2010 | ON | 3 | 55 | 4 |
| 6 | May 6, 2010 | ON | 3 | 55 | 5 |
| 7 | Nov. 12, 2011 | ON | 3 | 55 | 12 |
| 8 | Dec. 27, 2012 | ON | 3 | 55 | 27.9 |
| 9 | Dec. 31, 2012 | ON | 3 | 55 | 13.7 |
| 10 | Dec. 31, 2012 | ON | 3 | 55 | 18.7 |

Example 3

Blast-Test Apparatus: The Blast-Test Apparatus comprises a plastic launch vessel that had been modified such that the vessel does not contain or restrict the pressure resulting from an explosion. The apparatus also includes a vessel launcher, comprising a substantially tubular launch guide having a low friction interior surface, a plunger housed inside the tubular launch guide, positioned above the launch vessel and graduated numerical markings placed along the launch guide for measuring the resultant height of the blast. The Blast-Test Apparatus further included a base piece to receive the launch vessel and hold the launch guide in place during the launching.

Blast-Test: The launch vessel was placed inside the launch guide below the plunger, filled with a sample gas mixture captured from the gas generator system. To ensure the launch vessel was consistently filled with gas, the launch vessel was submerged upside-down in water such that the launch vessel was filled with water. The gas mixture resulting from the gas generator system was supplied to the inside of the launch vessel (e.g., via tube 260) and as the gas filled the launch vessel, it displaced the water. The time to displace all of the water was recorded. Using that fill time plus a couple of extra seconds, the launch vessel was placed in the Blast-Test Apparatus described above and repeatably filled with a gas mixture for the appropriate fill time. The gas mixture was generated from either an exemplary system (including flow diversion) with the ERT or an exemplary system without the ERT with Restricted Flow (as noted). In each of the tests, the current supplied to the cell was limited to 30 amps. The gas was ignited, lit creating an explosive blast, that propelled the launch vessel against the plunger within the launch guide. The maximum distance that the bottle and plunger traveled inside the tubular support was recorded by the position of the plunger in the launch guide. These results are shown in Table 3:

TABLE 3

| Blast-Test | | |
| --- | --- | --- |
| Run | With ERT | Distance (inches) |
| 1 | yes | 16⅞ |
| 2 | yes | 17⅛ |
| 3 | yes | 16³⁄₁₆ |
| 4 | no | 13⁷⁄₁₆ |
| 5 | no | 13¼ |
| 6 | no | 13⅞ |

Example 4

Defoaming Test: An exemplary embodiment of the system described herein was configured in four different ways—(1) an exemplary system without an ERT or bubble buster, (2) an exemplary system with only the ERT, (3) an exemplary system with only the bubble buster, and (4) an exemplary system with both the ERT and bubble buster. The system was run 5 times for each configuration. All runs were done at 50 amps and 1.478 kHz frequency for the pulse width modulated voltage source. For configuration 1, the amount of time before the system stopped was recorded. For configurations 2, 3, and 4, the system was run for 3 minutes and 2 seconds and the height of the foam was measured. The Results of the Defoaming Test are shown in Table 4:

TABLE 4

| System Description | (1) Exemplary System with no ERT or Bubble Buster | | | | |
| --- | --- | --- | --- | --- | --- |
| Run # | 1 | 2 | 3 | 4 | 5 |
| Time until System Stops (min:secs) | 2:18 | 2:41 | 3:28 | 3:08 | 3:36 |
| System Description | (2) Exemplary System with ERT Only | | | | |
| Run # | 1 | 2 | 3 | 4 | 5 |

TABLE 4-continued

| Height of Foam after 3:02 (inches) | 4.0 | 3.75 | 4.25 | 4.5 | 4.75 |
|---|---|---|---|---|---|

| System Description | (3) Exemplary System with Bubble Buster Only | | | | |
|---|---|---|---|---|---|
| Run # | 1 | 2 | 3 | 4 | 5 |
| Height of Foam after 3:02 (inches) | 5.25 | 5.25 | 5.0 | 5.2 | 5.5 |

| System Description | (4) Exemplary System with Both ERT and Bubble Buster | | | | |
|---|---|---|---|---|---|
| Run # | 1 | 2 | 3 | 4 | 5 |
| Height of Foam after 3:02 (inches) | 4.0 | 3.5 | 3.375 | 3.5 | 3.5 |

While exemplary embodiments have been shown and described herein, it will be obvious to those skilled in the art that such exemplary embodiments are provided by way of example only. It is intended that the following claims define the scope of the invention and that methods and structures within the scope of these claims and their equivalents be covered thereby.

What is claimed is:

1. A system, comprising:
   a tank configured to store an electrolyte solution;
   an electrolysis cell that is configured to generate gas by performing electrolysis on the electrolyte solution;
   a pump that is configured to move the electrolyte solution from the tank and the electrolysis cell;
   an energy relief tube that is located inside the tank, that has a first end that is connected to a tube that connects the pump to the tank, that has a second end that is above a level of the electrolyte solution in the electrolysis cell, and that is configured to prevent foam from forming in the tank by creating a vacuum within the tank; and
   an output that is configured to provide the gas to an air intake of an internal combustion engine upstream of a turbo fan.

2. The system of claim 1, comprising:
   a scrubber that is configured to:
      receive the gas from the electrolysis cell;
      provide the gas to the output; and
      remove moisture or the electrolyte solution from the gas before providing the gas to the output.

3. The system of claim 1, comprising:
   a radiator that is configured to:
      receive the electrolyte solution from the electrolysis cell;
      provide the electrolyte solution to the tank; and
      dissipate heat from the electrolyte solution before providing the electrolyte solution to the tank.

4. The system of claim 1, comprising:
   a flow diversion mechanism that is configured to receive the electrolyte solution from the electrolysis cell and provide the electrolyte solution to the tank.

5. The system of claim 1, wherein the electrolysis cell is configured to generate the gas by performing electrolysis on the electrolyte solution while in a horizontal or vertical orientation.

6. The system of claim 1, comprising:
   a bubble buster that is configured to: receive the electrolyte solution from the electrolysis cell;
   provide the electrolyte solution to the tank; and
   break a surface tension of bubbles or foam in the electrolyte solution before providing the electrolyte solution to the tank.

7. The system of claim 1, comprising:
   a controller that is configured to provide power to the electrolysis cell.

8. The system of claim 1, wherein the gas is an oxygen-hydrogen gas mixture.

9. A method comprising:
   storing, by a tank, an electrolyte solution;
   generating, by an electrolysis cell, gas by performing electrolysis on the electrolyte solution;
   moving, by a pump, the electrolyte solution from the tank and the electrolysis cell;
   preventing, by an energy relief tube that is located inside the tank, that has a first end that is connected to a tube that connects the pump to the tank, and that has a second end that is above a level of the electrolyte solution in the electrolysis cell, foam from forming in the tank by creating a vacuum within the tank; and
   providing, by an output and to an air intake of an internal combustion engine upstream of a turbo fan, the gas.

10. The method of claim 9, comprising:
    receiving, by a scrubber, the gas from the electrolysis cell;
    removing, by the scrubber, moisture or the electrolyte solution from the gas; and
    providing, by the scrubber and to the output, the gas with the moisture or the electrolyte solution removed.

11. The method of claim 9, comprising: receiving, by a radiator, the electrolyte solution from the electrolysis cell; dissipating, by the radiator, heat from the electrolyte solution; and providing, by the radiator and to the tank, the electrolyte solution with the heat dissipated.

12. The method of claim 9, comprising: receiving, by a flow diversion mechanism, the electrolyte solution from the electrolysis cell; and providing, by the flow diversion mechanism, the electrolyte solution to the tank.

13. The method of claim 9, wherein generating, by the electrolysis cell, gas by performing electrolysis on the electrolyte solution comprises:
    generating, by the electrolysis cell, while the electrolysis cell is a horizontal or vertical orientation.

14. The method of claim 9, comprising: receiving, by a bubble buster, the electrolyte solution from the electrolysis cell; breaking, by the bubble buster, a surface tension of bubbles or foam in the electrolyte solution;
    and providing, by the bubble buster, the electrolyte solution to the tank with the surface tension of the bubbles or the foam broken.

15. The method of claim 9, comprising: providing, by a controller, power to the electrolysis cell.

16. The method of claim 9, wherein the gas is an oxygen-hydrogen gas mixture.

* * * * *